US009067254B2

(12) United States Patent
Espinel et al.

(10) Patent No.: US 9,067,254 B2
(45) Date of Patent: Jun. 30, 2015

(54) METHOD OF CONFIGURING A PRODUCTION LINE TO MASS CUSTOMIZE SHAPED VESSELS

(75) Inventors: Ruth Karina Espinel, Norcross, GA (US); Scott C. Biondich, Alpharetta, GA (US); Alejandro Jose Santamaria, Suwanee, GA (US); John E. Adams, Alpharetta, GA (US); Katherine W. Allen, Newnan, GA (US); Gopalaswamy Rajesh, Alpharetta, GA (US); H. Brock Kolls, Alpharetta, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 545 days.

(21) Appl. No.: 12/577,299

(22) Filed: Oct. 12, 2009

(65) Prior Publication Data

US 2010/0095502 A1     Apr. 22, 2010

Related U.S. Application Data

(60) Provisional application No. 61/105,961, filed on Oct. 16, 2008.

(51) Int. Cl.
*B23P 23/00* (2006.01)
*B21D 51/26* (2006.01)
*G05B 19/418* (2006.01)
*G06Q 10/06* (2012.01)

(52) U.S. Cl.
CPC ........... *B21D 51/26* (2013.01); *Y10T 29/49716* (2015.01); *G05B 19/4187* (2013.01); *Y10T 29/5124* (2015.01); *G06Q 10/06* (2013.01)

(58) Field of Classification Search
USPC .............. 29/401.1, 563; 700/95, 96, 97, 117; 705/26
See application file for complete search history.

(56) References Cited

U.S. PATENT DOCUMENTS

| RE19,273 | E | * | 8/1934 | Oberhoffken | 408/10 |
| 3,245,569 | A | | 4/1966 | Essich | |
| 3,318,301 | A | * | 5/1967 | Schibley | 126/37 R |
| 3,426,564 | A | * | 2/1969 | Jansen et al. | 72/56 |
| 3,807,928 | A | * | 4/1974 | Horberg et al. | 425/526 |
| 3,871,611 | A | * | 3/1975 | Taketa | 249/102 |
| 4,007,851 | A | | 2/1977 | Walker | |
| 4,151,976 | A | * | 5/1979 | Schurman | 249/102 |

(Continued)

FOREIGN PATENT DOCUMENTS

| EP | 87854 A1 * | 9/1983 | ............. B29D 23/18 |
| JP | 04099611 A * | 3/1992 | ............. B29C 45/00 |

(Continued)

*Primary Examiner* — Essama Omgba
(74) *Attorney, Agent, or Firm* — Dentons US LLP

(57) ABSTRACT

A method of configuring a production line to mass customize shaped vessels includes receiving a plurality of consumer or event data. Further, the method includes configuring a plurality of vessel forming stations based in part on the received consumer or event data. Once the vessel forming stations are configured, a plurality of vessels are shaped by indexing the plurality of vessels through the vessel forming stations. The shaping operation can include shaping by contouring a length of each of the plurality of vessels, selecting a decoration style to be applied to the plurality of vessels based in part on the consumer or event data, and configuring a top-forming station based in part on the consumer or event data.

24 Claims, 25 Drawing Sheets

(56) References Cited

U.S. PATENT DOCUMENTS

| | | | |
|---|---|---|---|
| 4,416,604 A * | 11/1983 | Bender et al. | 425/183 |
| 4,504,206 A * | 3/1985 | Lupke et al. | 425/326.1 |
| 4,551,084 A * | 11/1985 | Lake | 425/185 |
| 4,684,101 A * | 8/1987 | Wagner et al. | 249/144 |
| 4,718,882 A * | 1/1988 | Bressler et al. | 493/164 |
| 4,822,326 A | 4/1989 | Ullman et al. | |
| 4,958,292 A * | 9/1990 | Kaneko et al. | 700/106 |
| 5,120,480 A * | 6/1992 | Anderson | 264/46.5 |
| 5,249,449 A | 10/1993 | Lee et al. | |
| 5,255,889 A * | 10/1993 | Collette et al. | 249/102 |
| 5,295,804 A * | 3/1994 | Dinnan | 425/182 |
| 5,411,699 A * | 5/1995 | Collette et al. | 264/523 |
| 5,434,790 A * | 7/1995 | Saka et al. | 700/110 |
| 5,448,903 A | 9/1995 | Johnson | |
| 5,551,860 A * | 9/1996 | Budzynski et al. | 425/504 |
| 5,551,861 A * | 9/1996 | Baldi | 425/527 |
| 5,556,648 A * | 9/1996 | Budzynski et al. | 425/150 |
| 5,571,474 A * | 11/1996 | Przytulla | 264/534 |
| 5,718,352 A | 2/1998 | Diekhoff et al. | |
| 5,736,168 A * | 4/1998 | Goyal et al. | 425/183 |
| 5,822,843 A | 10/1998 | Diekhoff et al. | |
| 5,823,372 A | 10/1998 | Levine | |
| 5,829,295 A * | 11/1998 | Voth et al. | 72/181 |
| 5,832,769 A | 11/1998 | Schultz | |
| 5,845,527 A | 12/1998 | Hoffmann et al. | |
| 5,970,767 A | 10/1999 | Hartman et al. | |
| 6,010,026 A | 1/2000 | Diekhoff et al. | |
| 6,113,377 A * | 9/2000 | Clark | 425/195 |
| 6,161,051 A | 12/2000 | Hafemann et al. | |
| 6,206,674 B1 * | 3/2001 | Foltuz et al. | 425/185 |
| 6,216,514 B1 * | 4/2001 | Bradbury et al. | 72/178 |
| 6,338,263 B1 | 1/2002 | Obata et al. | |
| 6,375,020 B1 | 4/2002 | Marquez | |
| 6,428,302 B1 * | 8/2002 | Tsau | 425/192 R |
| 6,428,304 B1 * | 8/2002 | Sartor et al. | 425/526 |
| 6,434,994 B2 * | 8/2002 | Bradbury et al. | 72/178 |
| 6,442,988 B1 | 9/2002 | Hamstra et al. | |
| 6,442,991 B1 | 9/2002 | Rojek | |
| 6,499,329 B1 | 12/2002 | Enoki et al. | |
| 6,591,989 B2 * | 7/2003 | McNeill | 206/494 |
| 6,594,642 B1 * | 7/2003 | Lemchen | 705/26.5 |
| 6,615,472 B2 * | 9/2003 | Petre | 29/426.1 |
| 6,648,623 B2 * | 11/2003 | Petre | 425/195 |
| 6,681,489 B1 * | 1/2004 | Fleming | 29/897.2 |
| 6,722,959 B2 * | 4/2004 | Opfer | 451/65 |
| 6,752,000 B2 | 6/2004 | Reynolds et al. | |
| 6,779,677 B2 | 8/2004 | Chupak | |
| 6,836,943 B2 * | 1/2005 | Chernoff et al. | 29/402.08 |
| 6,857,304 B2 | 2/2005 | Enoki | |
| 6,907,653 B2 | 6/2005 | Chupak | |
| 6,973,359 B2 * | 12/2005 | Holtan et al. | 700/100 |
| 6,998,006 B1 * | 2/2006 | Kessler et al. | 156/230 |
| 7,073,365 B2 | 7/2006 | Geho et al. | |
| 7,093,756 B2 * | 8/2006 | Muehl et al. | 235/451 |
| 7,107,804 B2 | 9/2006 | Gong et al. | |
| 7,108,498 B2 * | 9/2006 | Lai | 425/190 |
| 7,140,223 B2 | 11/2006 | Chupak | |
| 7,191,032 B2 | 3/2007 | MacEwen et al. | |
| 7,258,538 B2 * | 8/2007 | Miller | 425/182 |
| 7,308,915 B2 | 12/2007 | Johns et al. | |
| 7,354,234 B2 | 4/2008 | Fujishige et al. | |
| 7,543,269 B2 * | 6/2009 | Krueger et al. | 717/107 |
| 7,563,089 B2 * | 7/2009 | Dannebey et al. | 425/195 |
| RE41,572 E * | 8/2010 | Briere et al. | 425/195 |
| 8,020,420 B2 * | 9/2011 | Frattini | 72/94 |
| 8,042,249 B2 * | 10/2011 | Kilibarda | 29/430 |
| 8,156,470 B2 * | 4/2012 | Krueger et al. | 717/107 |
| 8,261,983 B2 * | 9/2012 | Sarma | 235/385 |
| 8,302,281 B2 * | 11/2012 | Kilibarda | 29/430 |
| 8,381,561 B2 * | 2/2013 | Santamaria et al. | 72/94 |
| 8,448,487 B2 * | 5/2013 | Adams et al. | 72/94 |
| 8,473,088 B2 * | 6/2013 | Carbonera et al. | 700/117 |
| 8,627,697 B2 * | 1/2014 | Adams et al. | 72/94 |
| 8,726,709 B2 * | 5/2014 | Allen et al. | 72/94 |
| 8,726,710 B2 * | 5/2014 | Biondich et al. | 72/94 |
| 8,770,957 B2 * | 7/2014 | Laumer | 425/73 |
| 8,857,232 B2 * | 10/2014 | Adams et al. | 72/94 |
| 8,944,794 B2 * | 2/2015 | Geltinger et al. | 425/73 |
| 2001/0052477 A1 * | 12/2001 | McNeill | 206/494 |
| 2002/0152001 A1 * | 10/2002 | Knipp et al. | 700/100 |
| 2002/0162371 A1 | 11/2002 | Hamstra et al. | |
| 2003/0037427 A1 * | 2/2003 | Chernoff et al. | 29/428 |
| 2003/0093171 A1 * | 5/2003 | Soehnlen | 700/117 |
| 2003/0102278 A1 | 6/2003 | Chupak | |
| 2003/0181148 A1 * | 9/2003 | Opfer | 451/65 |
| 2003/0216950 A1 * | 11/2003 | Chen | 705/8 |
| 2004/0084520 A1 * | 5/2004 | Muehl et al. | 235/376 |
| 2004/0096535 A1 * | 5/2004 | Hudecek et al. | 425/193 |
| 2004/0148778 A1 * | 8/2004 | Fleming | 29/897.2 |
| 2004/0173560 A1 | 9/2004 | Chupak | |
| 2004/0187536 A1 | 9/2004 | Gong et al. | |
| 2005/0119944 A1 * | 6/2005 | Harasaki et al. | 705/26 |
| 2005/0127077 A1 | 6/2005 | Chupak | |
| 2005/0218140 A1 | 10/2005 | Enoki et al. | |
| 2005/0252263 A1 * | 11/2005 | MacEwen et al. | 72/55 |
| 2006/0000623 A1 * | 1/2006 | Ortt et al. | 173/1 |
| 2006/0018698 A1 * | 1/2006 | Vogt | 400/149 |
| 2006/0043054 A1 | 3/2006 | Matheis | |
| 2006/0095151 A1 * | 5/2006 | Mannlein et al. | 700/117 |
| 2006/0172035 A1 * | 8/2006 | Miller | 425/525 |
| 2006/0182841 A1 * | 8/2006 | Rodriguez et al. | 425/526 |
| 2006/0277957 A1 * | 12/2006 | Fujishige et al. | 72/46 |
| 2007/0059396 A1 * | 3/2007 | Miller | 425/525 |
| 2007/0186610 A1 * | 8/2007 | Vanleene | 72/239 |
| 2007/0198117 A1 * | 8/2007 | Wajihuddin | 700/114 |
| 2007/0251803 A1 * | 11/2007 | Schill et al. | 198/418.2 |
| 2008/0006072 A1 | 1/2008 | Frattini | |
| 2008/0034823 A1 * | 2/2008 | Frattini et al. | 72/8.1 |
| 2008/0084013 A1 * | 4/2008 | Kilibarda | 269/37 |
| 2008/0148801 A1 | 6/2008 | Olson et al. | |
| 2009/0089738 A1 * | 4/2009 | Krueger et al. | 717/104 |
| 2009/0105860 A1 * | 4/2009 | Wiesel | 700/97 |
| 2009/0282782 A1 * | 11/2009 | Walker et al. | 53/410 |
| 2010/0030354 A1 * | 2/2010 | Wiesel | 700/97 |
| 2010/0030355 A1 * | 2/2010 | Insolia et al. | 700/97 |
| 2010/0095502 A1 * | 4/2010 | Espinel et al. | 29/401.1 |
| 2010/0095514 A1 * | 4/2010 | Santamaria et al. | 29/563 |
| 2010/0095723 A1 * | 4/2010 | Allen et al. | 72/46 |
| 2010/0095728 A1 * | 4/2010 | Adams et al. | 72/227 |
| 2010/0095734 A1 * | 4/2010 | Adams et al. | 72/362 |
| 2010/0095735 A1 * | 4/2010 | Biondich et al. | 72/362 |
| 2010/0100213 A1 * | 4/2010 | Allen et al. | 700/96 |
| 2012/0036701 A1 * | 2/2012 | Kilibarda | 29/430 |
| 2012/0072011 A1 * | 3/2012 | Sarma | 700/216 |
| 2012/0167038 A1 * | 6/2012 | Krueger et al. | 717/107 |
| 2013/0259608 A1 * | 10/2013 | Adams et al. | 413/1 |

FOREIGN PATENT DOCUMENTS

| | | |
|---|---|---|
| WO | WO2006/095215 | 9/2006 |
| WO | WO2007089736 A2 | 8/2007 |

* cited by examiner

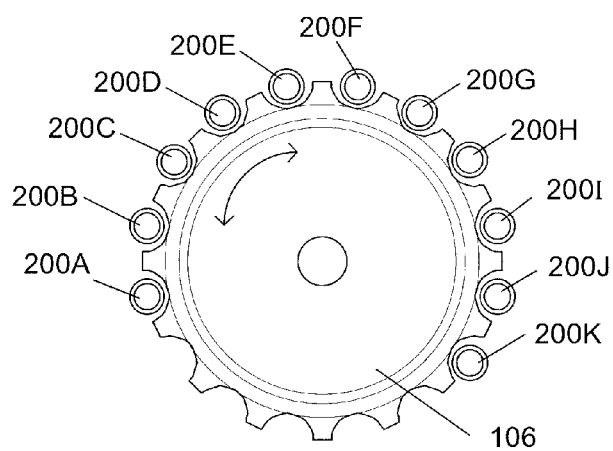
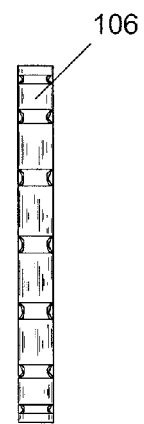
Fig. 2A    Fig. 2B
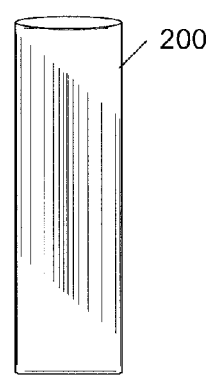
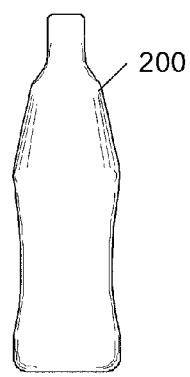
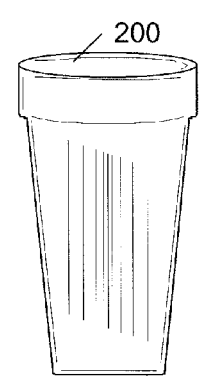
Fig. 3A    Fig. 3B    Fig. 3C

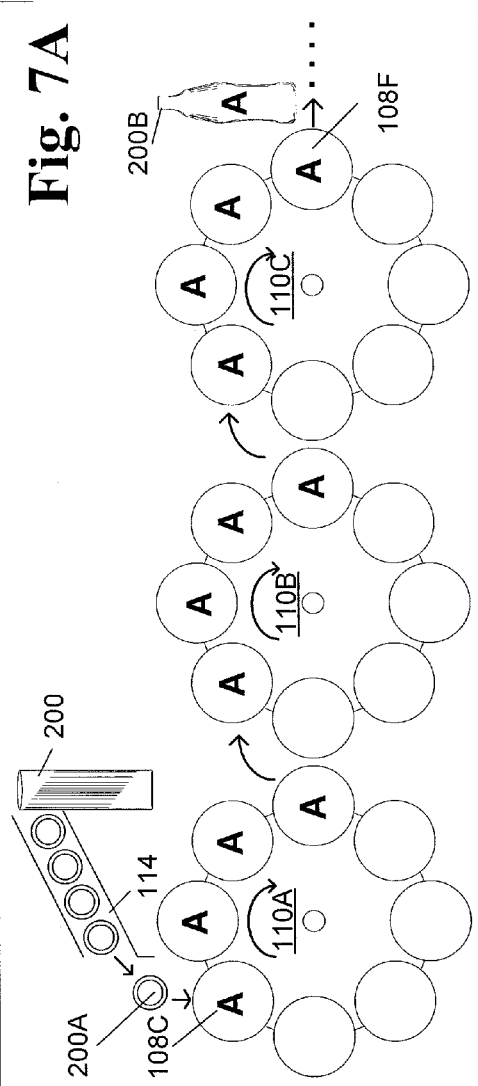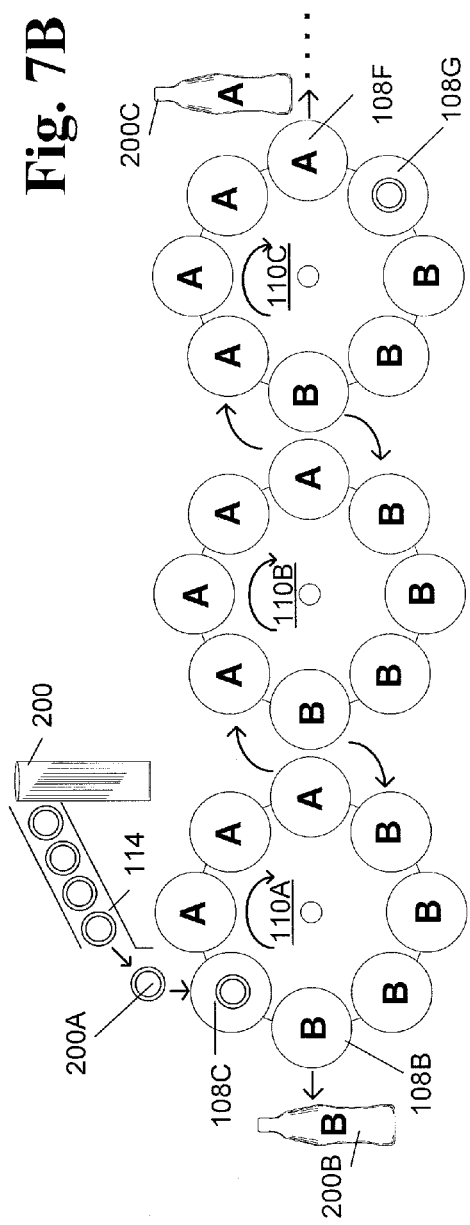

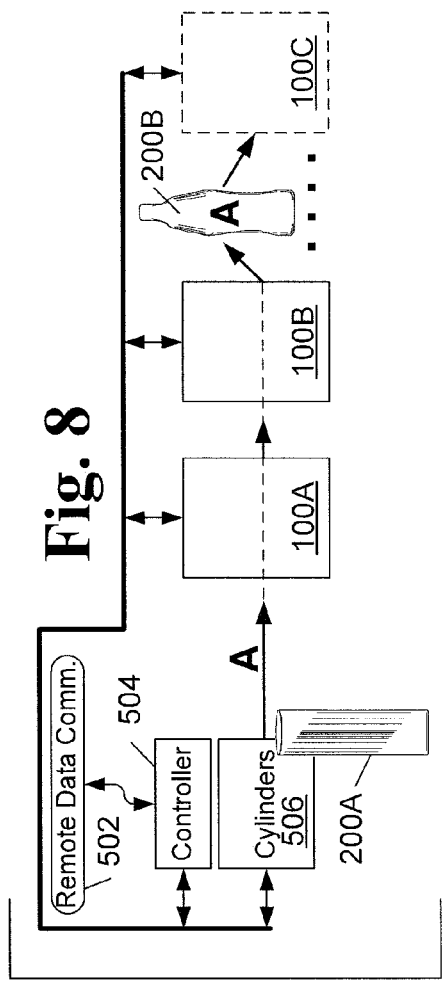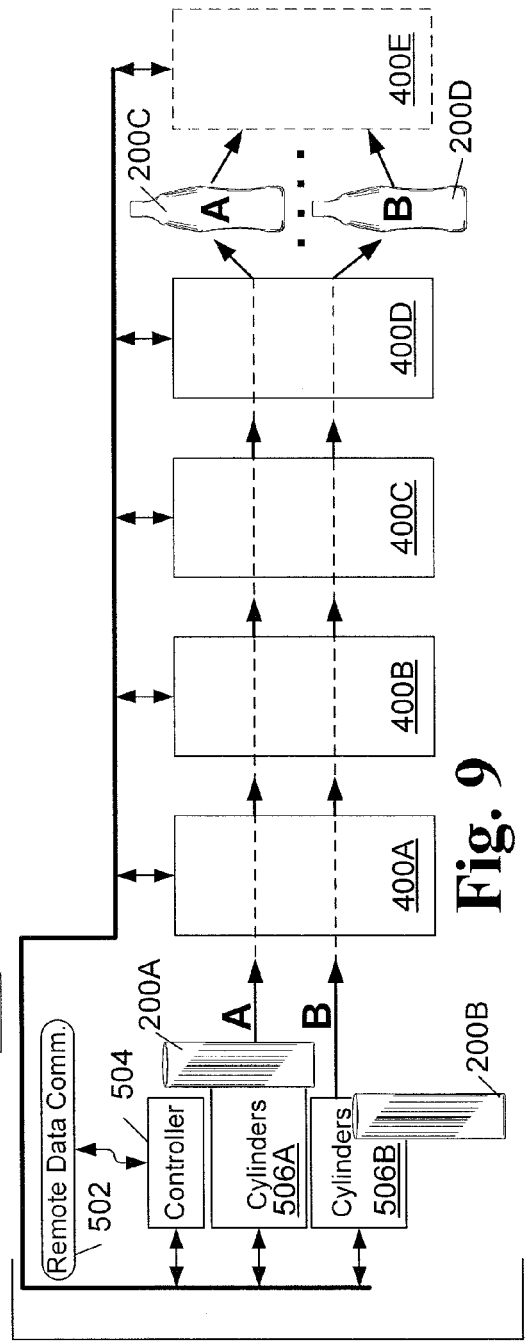

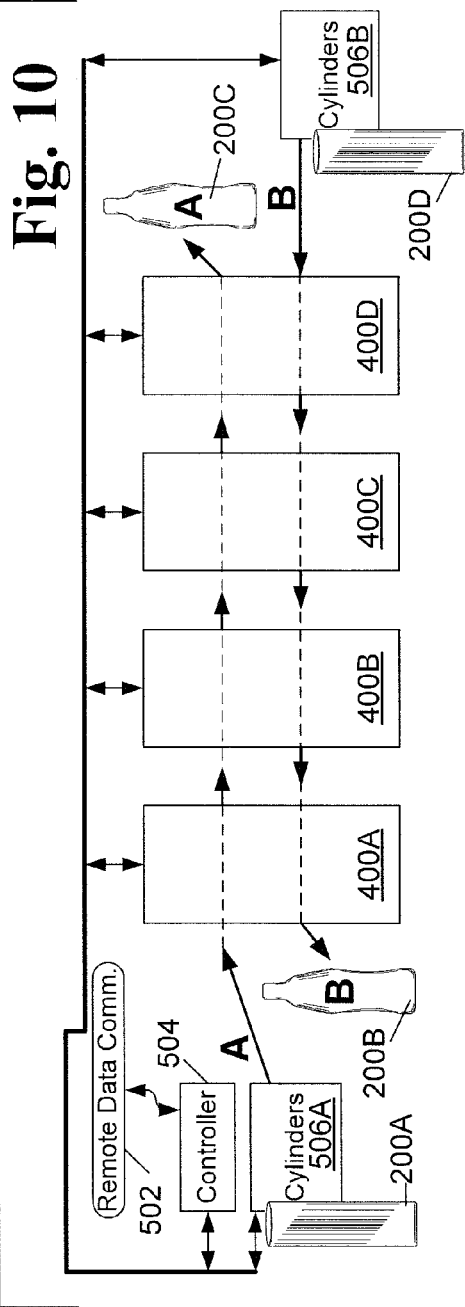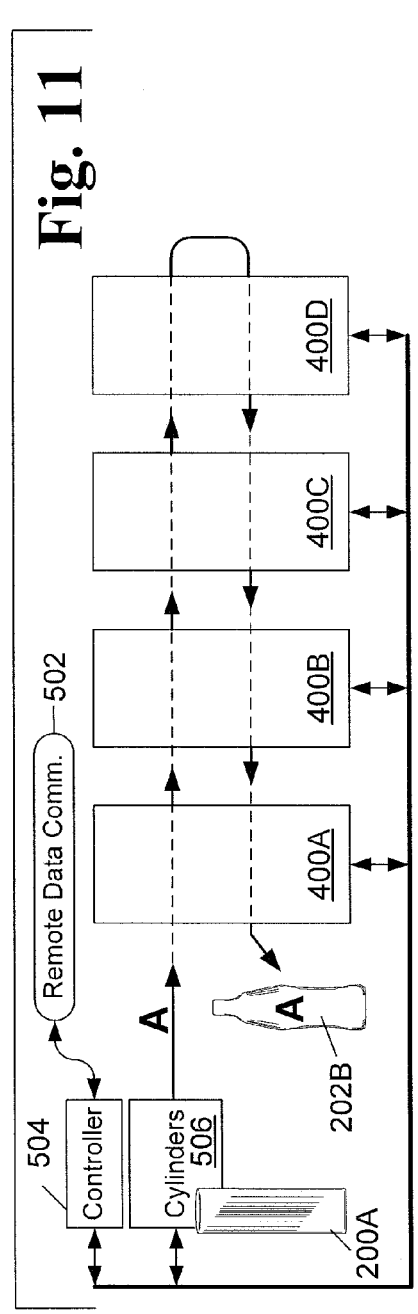

3000

7000

METHOD OF CONFIGURING A PRODUCTION LINE TO MASS CUSTOMIZE SHAPED VESSELS

TECHNICAL FIELD OF THE INVENTION

This invention relates to a method of configuring a production line to mass customize shaped vessels and particularly to a method comprising receiving a plurality of consumer or event data, configuring a plurality of vessel forming stations based in part on received plurality of consumer or event data, and shaping a plurality of vessels by indexing the plurality of vessels through the plurality of vessel forming stations.

BACKGROUND OF THE INVENTION

Before our invention there were various techniques for shaping metal vessels. None of these techniques alone were particularly well suited to provide a low cost, lightweight contoured vessel by way of a high speed production line, wherein the contoured vessel is made form highly recyclable metal and the production line decoration and vessel shaping can be easily customized.

With regards to metal shaping, current metal shaping methods employ concepts of hydro forming, wherein a fluid is used at high pressure to shape the metal. Other methods include pressure ram forming, wherein a ram is pressed into a metal perform to deforming the metal into the shape of a surrounding mold, and yet other methods include using linear motion in combination with a die to shape the metal.

However, each of these methods has shortcomings when it comes to using the method in a standalone application of manufacturing vessels in high volume production lines and none of the methods purport dynamic and flexible shape customization as an ability or asset.

With regards to hydro forming, forming time can be lengthy. It is not uncommon for it to take several minutes to deform a single piece of metal and as such hydro forming though a reliable forming option does not lend itself well to trying to achieve vessel forming at line speeds of around 600 or more vessels per minute. With regards to pressure ram forming molds are required and as such can limit the customizability of the shaped vessel. In addition, there is a tight design relationship between the ram design and the mold that can limit vessel customization flexibility. With regards to die forming it can be the shear number of dies required to shape a vessel that can be a limiting factor for vessel customization flexibility.

On the other hand these and a few other techniques have been developed to shape metal and as such to manufacture shaped metal vessels at high speeds requires using these and other techniques in an innovative new way incorporating these and other technologies into a production line configuration that overcome the limitations and builds in the ability to mass customize the production line, decoration applied to the vessel, and the shaped vessel itself.

What is needed is a solution that can be scaled to accommodate as many metal forming technologies that are required to raise production speeds and line efficiencies, increasing the number of types and kinds of shaped vessels producible by a single production line. These production line speed increases, efficiencies, and variation capabilities of the shaped vessels are required to increase customization capabilities and lower the shaped metal vessel production costs. Such factors barriers are currently gating items in being able to scale volume, create distribution opportunities, and meet changing on-the-go consumer needs.

Currently there are production lines that can manufacture metal packaging; however these lines among other things, do not posses the capability of dynamic on-the-fly changeovers, do not accept consumer or event data to create customized packaging, and cannot be scaled in configurations to produce a multitude of varying sizes, decoration styles, and shaped vessels. Furthermore, current metal packaging production lines typically do not have the capability to contour the vessel along its entire length. Instead metal shaping is typically limited to the top or bottom portion only as many metal forming techniques are not capable of contouring an entire surface length.

Even if the technological problems of speed and shape were overcome for a single production line it would be too costly to build a production line to produce only a single type or kind of vessel. As such, there is a long felt need for a production line that can shape and contour the entire surface of the metal vessel and has the inherent flexibility to produce many different types, sizes, and kinds of shaped metal vessels. Furthermore, there is a long felt need to consolidate non-shape forming operations such as decoration, trimming, and top forming, to name a few into the shaping process as a way to further reduce production line costs, increase metal packaging reliabilities and speed the vessel forming process.

Furthermore, consumer packaging insights suggest consumer's want more choices of grip, shape, decoration, styles, coatings, and closure type to meet the ever expanding on-the-go lifestyle. All of these features are unmet needs with current technology. In addition, current metal forming techniques alone cannot meet the needs of consumer's and cannot meet the sensitive packaging cost targets necessary to open the metal vessel market to mass consumers packaging opportunities.

In this regard, current hindrances in addition to the speed of metal forming technologies, decoration customization abilities, and top form flexibilities include metal forming production line changeover. In this regard, to be competitive a production line changeover can no longer be measured in hours, instead changeover needs to be done on-the-fly accommodating different sizes, shapes, and decoration styles driven by business insights, technical insights, and consumer needs.

These reasons, issues, and problems as well as other reasons, issues, and problems give rise to a long felt need for the present invention.

SUMMARY OF THE INVENTION

The shortcomings of the prior art are overcome and additional advantages are provided through the provision of a method of configuring a production line to mass customize shaped vessels, the method comprising receiving a plurality of consumer or event data, configuring a plurality of vessel forming stations based in part on received the plurality of consumer or event data, and shaping a plurality of vessels by indexing the plurality of vessels through the plurality of vessel forming stations.

Additional shortcomings of the prior art are overcome and additional advantages are provided through a method of configuring a production line to mass customize shaped vessels, the method comprising receiving a plurality of consumer or event data, configuring a decoration station based in part on received the plurality of consumer or event data, configuring a plurality of vessel forming stations based in part on received the plurality of consumer or event data, configuring a top-forming station based in part on received the plurality of consumer or event data, and shaping a plurality of vessels by indexing the plurality of vessels through the decoration station, the plurality of vessel forming stations, and the top forming station.

Additional shortcomings of the prior art are overcome and additional advantages are provided through a method of configuring a production line to mass customize shaped vessels, the method comprising receiving a plurality of consumer or event data, configuring a decoration station based in part on received the plurality of consumer or event data, configuring a plurality of vessel forming stations based in part on received the plurality of consumer or event data, each of the plurality of vessel forming stations has at least one of an operation wheel, configuring a top-forming station based in part on received the plurality of consumer or event data, selecting a pathway through the plurality of vessel forming stations to index the plurality of vessels across, controlling rotational indexing direction across the operation wheel along selected the pathway, and shaping a plurality of vessels by indexing the plurality of vessels through the decoration station, the plurality of vessel forming stations, and the top forming station.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 2A-B illustrate one example of a star wheel 106 having a plurality of reservoirs to support and transport a plurality of vessels 200A-K. FIG. 2B is a side view of star wheel 106;

FIGS. 3A-C illustrate one example of a vessel 200. FIG. 3A illustrates one example of a straight wall cylinder, FIG. 3B illustrates one example of a formed vessel also referred to as a shaped vessel, and FIG. 3C illustrates one example of a formed vessel also referred to as a cup or vessel;

FIG. 3D illustrates threaded top forming 202 and neck ring 204. FIG. 3E illustrates die forming top forming 206 also referred to as die curling 206. FIG. 3F illustrates threaded top forming 202, die curling 206, and inverted neck ring 204. The inverted neck ring of FIG. 3F is an inward groove type. For purposes of disclosure a neck ring and an inverted neck ring can be referred to as a necking.

FIG. 4B is a side view of the operation wheel 110;

FIG. 7A illustrates one example of a plurality of operation wheels 110A-C configured with a die set 'A' illustrating how in an exemplary embodiment a cylinder 200 can be conveyed by conveyor 114 into operation wheel 110A at position 108C and sequentially indexed clockwise through each of the plurality of shape forming dies 'A' and then conveyed from wheel 110A to wheel 110B, and then conveyed from wheel 110B to wheel 110C, exiting as a shaped vessel 200 from wheel 110C at location 108F;

FIG. 7B illustrates one example of a plurality of operation wheels 110A-C configured with a shape forming die set 'A' and a shape forming die set 'B' illustrating how, in an exemplary embodiment, a cylinder 200 can be conveyed as cylinder 200A by conveyor 114 into operation wheel 110A at position 108C and sequentially indexed clockwise through each of the plurality of dies 'A', then conveyed from wheel 110A to wheel 110B, and then conveyed from wheel 110B to wheel 110C, exiting as a shaped vessel 200C from wheel 110C at location 108F or returning through die set 'B' exiting from wheel 110A at location 108B as shaped vessel 200B. In an alternative exemplary embodiment, vessel 200A can enter wheel 110A at position 108C and be indexed through die set 'A' exiting as a shaped vessel 200C from wheel 110C position 108F and unformed vessels can enter wheel 110C at position 108G and be indexed through die set 'B' exiting as shaped vessel 200B from wheel 110A at position 108B effectuating the ability of two different vessel forming processes to occur simultaneously;

FIG. 8 illustrates one example a production line configured with a plurality of single channel vessel forming stations 100A-C that receive cylinders 200 by way of a cylinder feeder 506. A controller 504 controls the cylinder feeder 506 and each of the vessel forming stations 100A-C move vessels along pathway 'A' resulting in a shaped vessel 200B. In addition, the controller can data communicate by way of remote data communication interface 502 to a plurality of data processing resources including a plurality of global network based data processing resources;

FIG. 9 illustrates one example of a production line configured with a plurality of multi channel vessel forming stations 400A-E that receive cylinders 200A-B, from a plurality of cylinder feeders 506A-B. A controller 504 controls the cylinder feeders 506A-B and each vessel forming station 400A-E to move cylinders along pathway 'A' and/or pathway 'B' resulting in shaped vessels 200C and 200D respectively. In addition, the controller can data communicate by way of remote data communication interface 502 to a plurality of data processing resources including a plurality of global network based data processing resources;

FIG. 10 illustrates one example of a production line with a plurality of multi channel vessel forming stations 400A-D that receive cylinders 200A and 200D, from a plurality of cylinder feeders 506A-B. A controller 504 controls the cylinder feeders 506A-B and each vessel forming station 400A-D move cylinders along pathway 'A' and/or 'B' resulting in shaped vessels 200B-C respectively. In addition, the controller can data communicate by way of remote data communication interface 502 to a plurality of data processing resources including a plurality of global network based data processing resources;

FIG. 11 illustrates one example of a production line with a plurality of multi channel vessel forming stations 400A-D that receive cylinders 200A from a cylinder feeder 506A. A controller 504 controls the cylinder feeder 506A and each vessel forming station 400A-D to move cylinders along pathway 'A' looping on a return pathway at vessel forming station 400D resulting in shaped vessel 200B. In addition, the controller can data communicate by way of remote data communication interface 502 to a plurality of data processing resources including a plurality of global network based data processing resources;

The detailed description explains the preferred embodiments of the invention, together with advantages and features, by way of example with reference to the drawings.

DETAILED DESCRIPTION OF THE INVENTION

Figure 1:
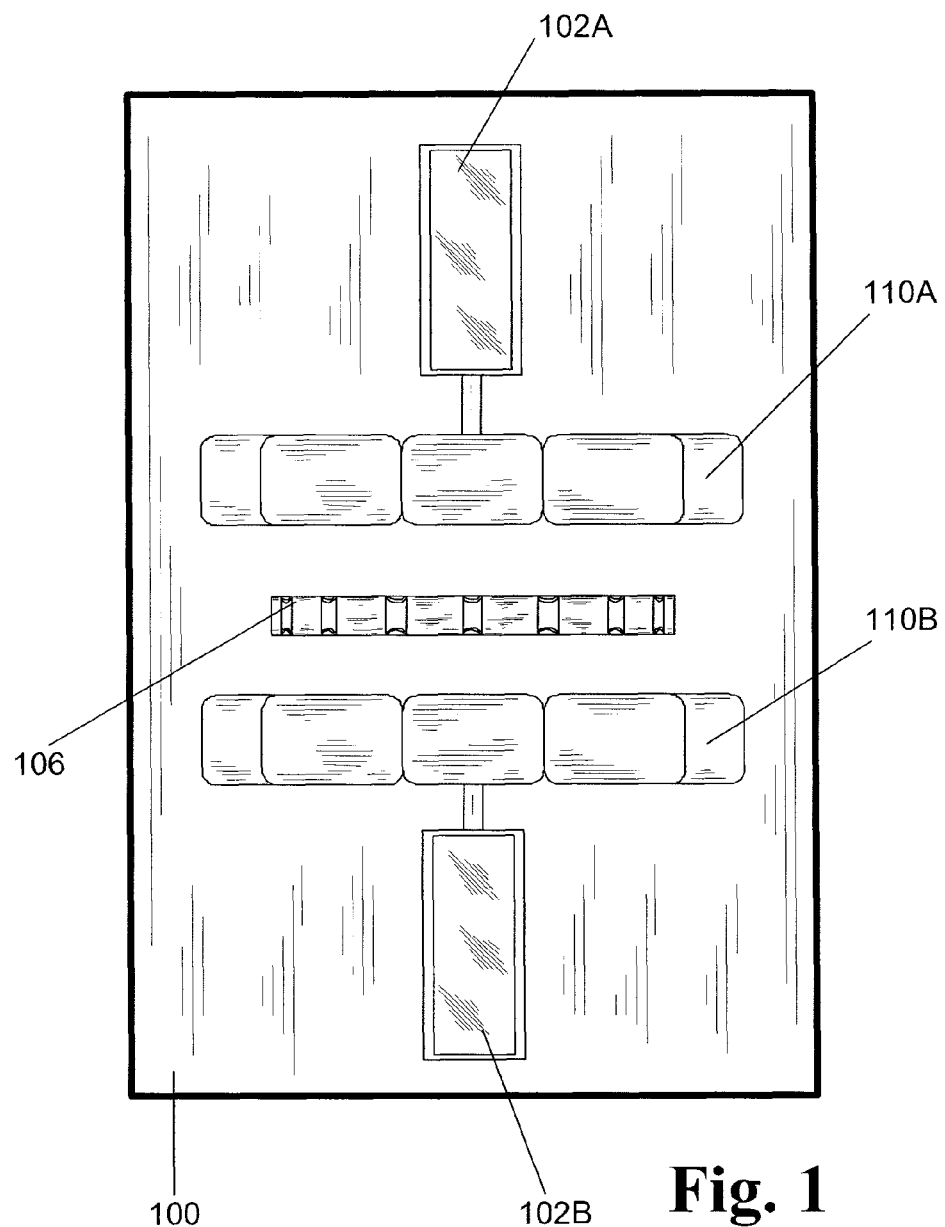
FIG. 1 illustrates one example of top view of a vessel forming station 100 having two linear drives 102A-B, which move operation wheels 110A-B along a plane in opposing directions to close and operate on a vessel and then separate allowing the vessel to be freely indexed to a next position. A star wheel 106 is positioned between operation wheels 110A-B and is used to index or transport a plurality of vessels in-through-and-out of the vessel forming station 100.

Turning now to the drawings in greater detail, it will be seen that in FIG. 1 there is illustrated one example of a top view of a vessel forming station 100 having two linear drives 102A-B, which move operation wheels 110A-B along a plane in opposing directions to close and operate on a vessel and then separate allowing the vessel to be freely indexed to a next position. A star wheel 106 is positioned between operation wheels 110A-B and is used to index or transport a plurality of vessels in-through-and-out of the vessel forming station 100. In an exemplary embodiment, a straight wall cylinder can be indexed through and operate upon at least one vessel forming station 100. The operations performed are designed to shape the cylinder resulting in a shaped vessel. Such precision operation and coordination among the various components of the system can be effectuated and coordinated by implementing a controller 504.

In operation, in an exemplary embodiment the star wheel 106 indexes a cylinder 200 (not shown) to at least some of the work zones 108 (not shown) associated with the operation wheels 110A-B. Once indexed into a working position the linear drives 102A-B extend causing the operation wheels 110A-B to move towards the cylinder 200 being held in position by star wheel 106. In this regard, an operation can be performed on the cylinder. Such an operation can include, for example and not a limitation, die forming, hydro forming, pressure ram forming, vacuum forming, magnetic impulse forming, trimming, smoothing, printing, etching, laser marking, embossing, de-embossing, top forming, applying outserts or inserts, or other operations as may be required and/or desired in a particular embodiment. The outsert is a finish that is applied over the vessel and positioned on the external surface of the vessel.

For purposes of disclosure shape forming operations can include die forming, hydro forming, pressure ram forming, vacuum forming, magnetic impulse forming, and/or other shape forming operations as may be required and or desired in a particular embodiment. Furthermore, non-shape forming operation can include trimming, smoothing, printing, etching, laser marking, embossing, de-embossing, top forming, applying outserts or inserts, and/or other non-shape forming operations as may be required and or desired in a particular embodiment.

In an exemplary embodiment a plurality of individual vessel forming stations 100 can be interconnected. In this regard, a cylinder can be operated upon at each of a plurality of work zone 108 associated with operation wheels 110 and then conveyed to a subsequent vessel forming station 100, such that work on the cylinder can continue. In an exemplary embodiment, this can allow expandability of the number and kinds of operations that can and/or need to be performed on a cylinder to achieve the desired shaped vessel.

For purposes of disclosure the operation wheels 110A-B are shown performing operations on a vessel, while the vessel is in the horizontal direction. In a plurality of embodiment the operation wheels can perform operations on the vessel with the vessel orientated in any axis. In this regard, the vessel can be shaped while in the horizontal, vertical, or other axis orientation as may be required and/or desired in a particular embodiment.

Referring to FIG. 2A-B there is illustrated one example of a star wheel 106 having a plurality of reservoirs to support and transport a plurality of vessels 200A-K. FIG. 2B is a side view of star wheel 106. In an exemplary, a star wheel 106 can be utilized to index cylinders in-through-and-out of vessel forming stations 100, 400. In addition, star wheels can be utilized to convey cylinders 200 between one vessel forming station and a next or subsequent vessel forming station, when a plurality of vessel forming stations 100, 400 are implemented. The star wheel 106 can be indexed in a clockwise or counterclockwise direction, as may be required and/desired in a particular embodiment. Such precision operation and coordination among the various components of the system including star wheel 106 can be effectuated and coordinated by implementing a controller 504.

Conveying or indexing can be effectuated by engaging a cylinder in a notch in the star wheel 106 as illustrated. The notch in the star wheel can have at least one small diameter hole for creating suction sufficient to hold the cylinders 200A-K into position. The suction can be created by a vacuum pressure created when air is evacuated from the mostly hollow star wheel 106. Alternatively, a mechanical holding system can hold the cylinders 200A-K in position. In a plurality of other exemplary embodiment cylinders 200A-K can be held into position on a star wheel 106 in other manners, as may be required and/or desired in a particular embodiment.

For disclosure purposes conveying or indexing can be incremental with a stop or pause at each operation position or can be continuous motion, wherein the star wheel 106 does not stop or pause at each operation position. An advantage of continuous operation is higher throughput of manufactured product. As such, conveying and indexing can be incremental with stops or pauses or continuous motion, as may be required and/or desired in a particular embodiment.

Referring to FIG. 3A-C there is illustrated one example of a vessel 200. FIG. 3A illustrates one example of a straight wall cylinder, FIG. 3B illustrates one example of a formed vessel also referred to as a shaped vessel, and FIG. 3C illustrates one example of a formed vessel also referred to as a cup or vessel. For purposes of disclosure a container, cylinder, formed container, bottle, contoured bottle, cup, vessel, or shaped vessel are all a vessel 200 and can interchangeably be referred to as a container, cylinder, formed container, shaped vessel, shaped bottle, bottle, cup, vessel, or contoured bottle.

In an exemplary embodiment such cylinders 200 can be fabricated from aluminum, aluminum alloy, steel, steel alloy, or other material, as may be required and/or desired for a particular embodiment. Such material can be procured from material suppliers such as NOVELIS, ARCO, REXAM, ALCOA, and/or other suppliers, as may be required and/or desired in a particular embodiment.

In an exemplary embodiment a plurality of straight walled vessels 200 are indexed in-through-and-out of a plurality of vessel forming stations 100, 400. As the vessel 200 is indexed through the selected vessel forming pathway a plurality of operations are performed on the vessel 200. Such plurality of operations can include, for example and not a limitation, die forming to shape the vessel 200, hydro forming to shape the vessel 200, pressure ram forming to shape vessel 200, vacuum forming to shape the vessel 200, magnetic impulse forming to shape the vessel 200, trimming, smoothing, printing, laser marking, etching, embossing, de-embossing, top forming, applying outserts or inserts, or other operation as may be required and/or desired in a particular embodiment. The outsert is a finish that is applied over the vessel and positioned on the external surface of the vessel.

In an exemplary embodiment, such number of operations performed on the vessel 200 can be few operations or many operations. The number of operation performed on a vessel 200 can often be in excess of 30-50. In this regard, the vessel 200 can be indexed and conveyed in-through-and-out of a plurality of vessel forming stations 100, 400 to complete the desired and/or required number of operations resulting in a contoured vessel 200 as illustrated in FIG. 3B.

In an exemplary embodiment, shape vessel forming can contour the vessels into similar shapes and with similar resolution of embossed or de-embossed shaped, images, graphics, and text as is found on plastic and/or PET enclosure. Such shaping attributes can promote consumer experiences of readable text, tactile feel, and/or other consumer experiences as may be required and/or desired in a particular embodiment.

Figures 3D, 3E, 3F:
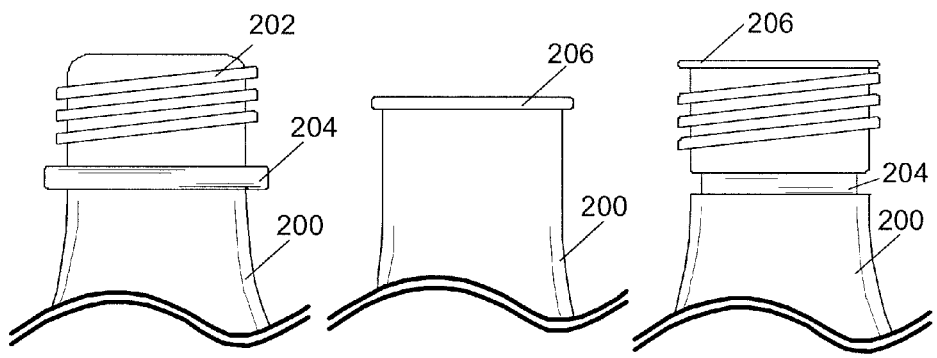
FIGS. 3D-F illustrate one example of various top forming and neck ring configurations that can be applied to a vessel 200.

Referring to FIGS. 3D-E there is illustrated one example of various top forming and neck ring configurations that can be applied to a vessel 200. FIG. 3D illustrates threaded top forming 202 and neck ring 204. FIG. 3E illustrates die forming top forming 206 also referred to as die curling 206. In an exemplary embodiment, a neck ring 204 can be formed from the vessel 200 or added as an outsert applied over the vessel opening and positioned on the external surface of the vessel. The use of the neck ring 204 on vessel 200 is analogous to the neck ring that is part of plastic or PET enclosure packaging. The threaded top forming 202 can allow for a screw on closure to be applied to the vessel 200 as a way to seal after filling the vessel. The die curling top form 206 can be utilized with jar lid, crown closure, and ring pulled crown finishes and can be applied to the vessel for sealing after the vessel has bee filled.

Figures 4A, 4B:
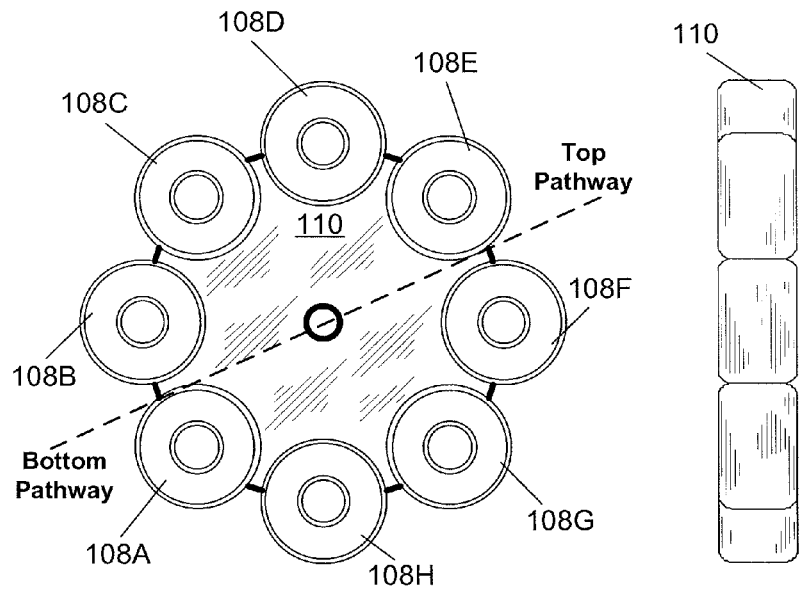
FIGS. 4A-4B illustrate one example of an operation wheel 110 having a plurality of work zones 108A-H, wherein each work zone 108 can be used to perform an operation on a vessel 200. Such operations can include for example and not a limitation die forming, hydro forming, pressure ram forming, vacuum forming, magnetic impulse forming, trimming, coating, smoothing, top forming, printing, laser marking, embossing, de-embossing, etching, or other operations as may be required and/or desired in a particular embodiment.

Referring to FIG. 4A-B there is illustrated one example of an operation wheel 110 having a plurality of working zones 108A-H, wherein each working zone 108 can be used to perform an operation on a vessel 200. Such operations can include for example and not a limitation, die forming to shape the vessel, hydro forming to shape the vessel, pressure ram forming to shape the vessel, vacuum forming to shape the vessel, magnetic impulse forming to shape the vessel, trimming, smoothing, top forming, printing, laser marking, etching, embossing, de-embossing, or other operations as may be required and/or desired in a particular embodiment. FIG. 4B is a side view of the operation wheel 110. Such precision operation and coordination among the various components of the system can be effectuated and coordinated by implementing a controller 504.

In an exemplary embodiment, at least two opposing operation wheels 110 move linearly to engage a vessel 200 that has been position by a star wheel 106. Typically the operation wheels 110 do not rotate rather the star wheel 106 indexes the vessels to the correct location such that the linear motion of the wheels 106 engages the positioned vessel 200. Once engaged each of the working zones 108 is configured to perform an operation on vessel 200. Such operation can be die forming to shape the vessel, wherein the action of the operation wheel 110 is to move, capture, and shape the vessel by pressing between two dies that have been designed to apply a slight bend to the side walls of the vessel 200. In an exemplary embodiment, it may take many different dies and die configurations to contour the length of the side wall of a vessel 200.

Another such operation can be hydro forming, wherein the vessel 200 can be captured in a work zone 108 by movement of opposing wheels 110. Once captured the work zone 108 can provide the molding shape (as necessary if required) and a fluid pressure can be injected into the vessel to cause hydro forming of vessel 200 to occur.

Another such operation can be pressure ram forming, wherein the vessel 200 can be captured in a work zone 108 by movement of opposing wheels 110. Once captured the work zone 108 can provide the molding shape (as necessary if required) and pressure ram forming techniques can be effectuated to shape vessel 200.

Another such operation can be vacuum forming, wherein the vessel 200 can be captured in a work zone 108 by movement of opposing wheels 110. Once captured the work zone 108 can provide a negative or positive pressure on the inside of the vessel to cause vacuum shaping of vessel 200.

Another such operation can be magnetic impulse forming, wherein the vessel 200 can be captured in a work zone 108 by movement of opposing wheels 110. Once captured the work zone 108 can provide a magnetic impulse of a force suitable to cause the vessel walls to distort and be shaped by a mold.

Another such operation can be smoothing. In an exemplary embodiment as operations are performed on the vessel 200 an operation of smoothing may be required to minimize the appearance of non-smooth contoured areas of the vessel. As an example and not a limitation, as successive die forming operations are performed on the vessel 200 to create the contoured shape ridges may become noticeable to the sight or touch resultant from the imperfections arising from the various die forming operations. As such, a smoothing operation can be employed to smooth out these ridge imperfections.

Another such operation can be trimming. In an exemplary embodiment, after the vessel 200 has been contoured, the open end of the cylinder may be uneven as metal has been moved during the shaping operations. Prior to top forming, outserting, or inserting it may be necessary to trim the uneven open edge of the vessel 200. As such, the operation of trimming the uneven edge or other types/kinds of trimming can then be performed, as may be required and/or desired in a particular embodiment.

Another such operation can be top forming. In an exemplary embodiment, the open end of the vessel can be prepared for receiving a closure after product has been dispensed into the vessel. The operation of top forming prepares the top of the vessel to receive the closure. Such top forming can include adding threads to the open end of the vessel 200 such that a screw type closure can be twisted on. Other types of top forming can include adding a rolled top edge to the vessel such that a crown style closure can be added. In addition, other types and/or kinds of top forming design and functionality can be effectuated, as may be required and/or desired in a particular embodiment.

Another such operation can be printing, laser marking, etching, embossing, de-embossing, or other operation. In an exemplary embodiment, a pre-decorated and/or undecorated vessel 200 may require additional decoration, labeling, and/or other printing. In this regard, one of the work zones 108 can be configured to apply the required and/or desired decoration style to the vessel. Vessel 200 forming can then continue after the printing, laser marking, etch, embossing, de-embossing, or other decoration has been applied.

One advantage of the present invention is that in an exemplary embodiment efficiencies, reduced costs, reliability, and less equipment in a production line can be realized by inserting a non-shape forming (as example other then die forming, hydro forming, pressure ram forming, vacuum forming, and/or magnetic impulse forming) stage in the vessel forming process. In this regard, a vessel can be contoured part way through the use of die forming and other forming techniques. An operation stage of trimming, printing, laser marking, etching, embossing, de-embossing, or other non-forming operation can then be performed. Upon completion of the non-forming operation stage, forming stages can then be resumed.

One advantage of being able to insert non-forming or non-shaping operation stages into the vessel forming station operation is that printing, laser marking, etching, embossing, and/or de-embossing can be difficult on contoured surfaces. In this regard, the vessel 200 can be shaped through a series of die forming, hydro forming, pressure ram forming, vacuum forming, magnetic impulse forming, smoothing, or other operations part way. Then while a non-contoured surface is still present on the vessel 200 printing, laser marking, etching, embossing, de-embossing, or other operation can be performed in the non-contoured area. Vessel 200 forming can then continue where forming now includes forming in the printed, laser marked, etched, embossing, de-embossing, or other operation area. When vessel forming is complete the finished product is both contoured and printed, laser marked, etched, embossing, de-embossing, or otherwise complete. This advantage can allow mass customization of vessel decoration and/or eliminate pre and/or post vessel 200 decoration stages.

One advantage of being able to insert non-forming or non-shaping operation stages into the vessel forming station operation is that top forming can be effectuated. In an exemplary embodiment, such top forming can be selective in that the type of top form can be either a crown finish, threaded finish, finish for outsert, finish for insert, no top forming finish, or other top forming finish as may be required and/or desired in a particular embodiment. An outsert is a finish that is applied over the vessel and positioned on the external surface of the vessel. This advantage allows the vessel forming station to selectively determine which finish is applied to which vessels. In addition, top forming style selection can be coordinated with mass customized decoration style in a print operation stage to selectively decorate vessels having different top formed finishes with different decoration styles.

For purposes of disclosure shown in FIG. 4A are eight working zones 108A-H. In a plurality of exemplary embodiment there can be more or less than eight working zones 108, as may be required and/or desired in the particular embodiment. In addition, the working zones can be symmetrically or non-symmetrically spaced around the operation wheel, be clustered close together, or be spaced as required and/or desired in a particular embodiment.

Figure 4C:
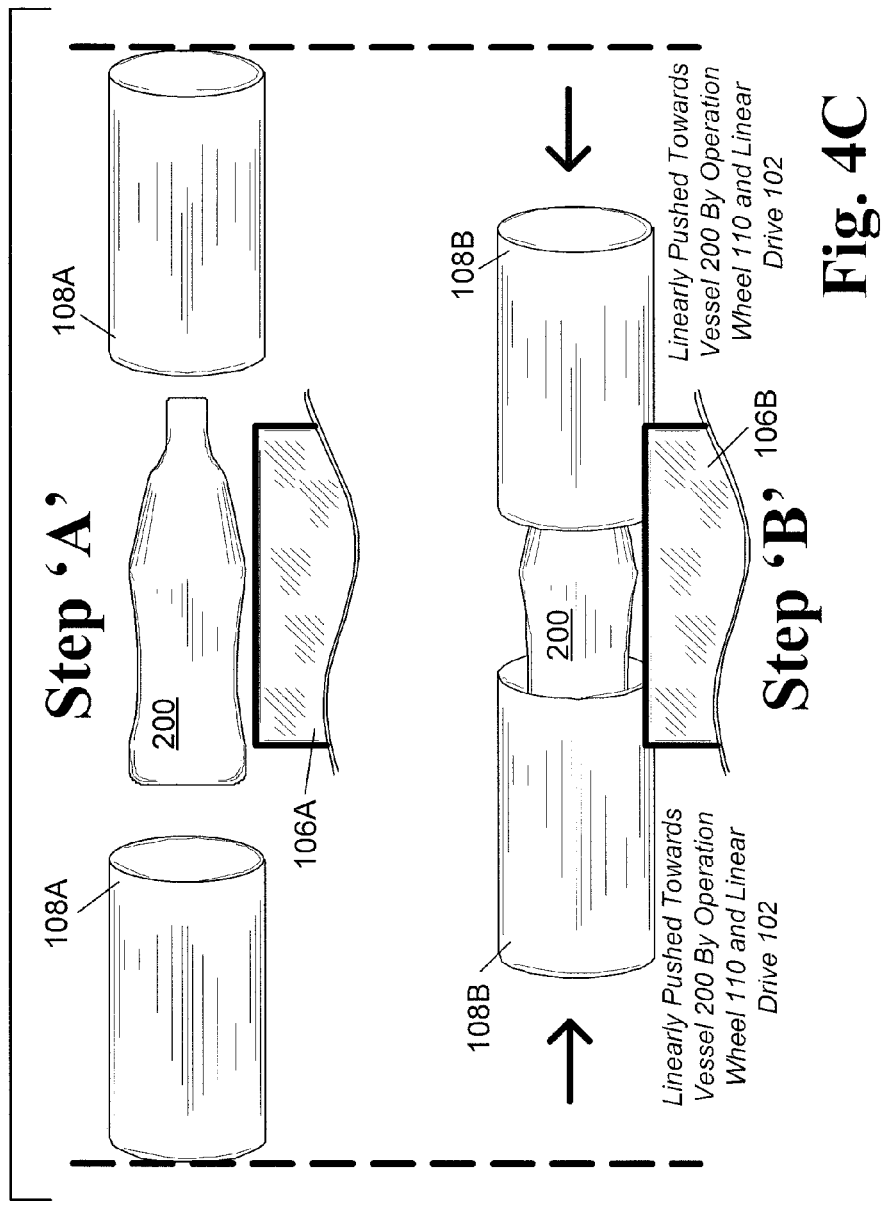
FIG. 4C illustrates one example of how operation wheels 110 engage and perform an operation on a vessel 200.

Referring to FIG. 4C there is illustrated one example of how operation wheels 110 engage and perform an operation on a vessel 200. In an exemplary embodiment the vessel is moved into position by star wheel 106 or other conveyer system. FIG. 4C illustrates this as step 'A'. Once in position the linear drives 102 can then be operated causing the operation wheels 110 to push the work zone operations 108 towards the vessel 200 in a manner to engage and operate on the vessel 200. FIG. 4C illustrates this as step 'B'. When the work zone 108 operation is complete the linear drives 102 retract the operation wheels 110 returning to the FIG. 4C step 'A' configurations. The start wheel 106 or other conveyer system can then index moving the vessel to the next operation or exiting to the next manufacturing process.

Figure 5:
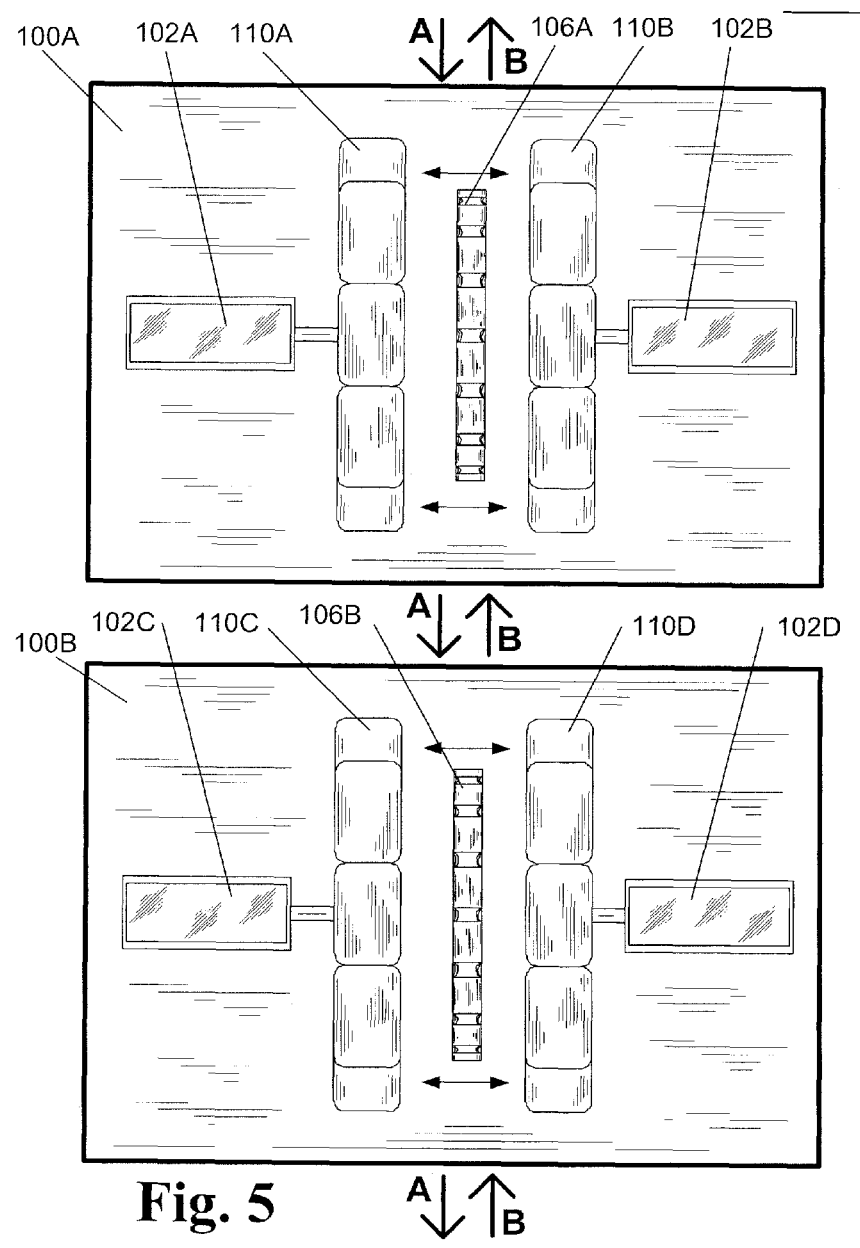
FIG. 5 illustrates one example of a top view of a plurality of vessel forming stations 100A-B configured proximate to one another to allow vessels 200 to pass along pathway 'A' and/or pathway 'B', wherein each of a plurality of work zones associated with the operation wheels 110A-D can be utilized to perform a plurality of operations on a plurality of vessels 200.

Referring to FIG. 5 there is illustrated one example of a top view of a plurality of vessel forming stations 100A-B configured proximate to one another to allow vessels 200 to pass along pathway 'A' and/or pathway 'B', wherein each of a plurality of work zones associated with the operation wheels 110A-D can be utilized to perform a plurality of operations on a plurality of vessels 200.

In an exemplary embodiment a plurality of vessel forming stations can be positioned proximate such that vessels 200 can be indexed in-through-and-out of one vessel forming station 100A and then conveyed into a second vessel forming station 100B, and if required and/or desired in a particular embodiment conveyed to subsequent vessel forming stations.

An advantage in this type of embodiment is that a plurality of vessel forming stations can be combined scaling the number of work zones 108 available to perform operation on a vessel 200. As such, more forming steps can be implemented, or operation stages such as trimming, smoothing, top forming, printing, laser marking, etching, embossing, de-embossing, or other operation stages can be added, as may be required and/or desired in a particular embodiment.

In operation, in an exemplary embodiment, vessels 200 can enter vessel forming station 100A at operation wheel 110A-B position 108B (shown in FIG. 4A). The vessel can be indexed in the pathway labeled 'A' by star wheel 106A. Operations can be performed on the vessel 200 with the movement of the operation wheels 110A-B towards the vessel 200 effectuated by way of the linear drives 102A-B. Each time the operation wheels return to the fully retracted open position the vessel if free from the operation stage and secured by the star wheel 106A. A clockwise rotation of the star wheel 106 indexes the vessel 200 to the next operation stage position. Successive indexing and operation of the vessel 200 results in the vessel moving through work zones 108B, 108C, 108D, and 108E. The vessel is then conveyed to the second vessel forming station 100B where the vessel is indexed and operated on by operation wheels 110C-D. Operation wheels 110C-D are driven by linear drives 102C-D.

Along pathway 'A' the vessel is indexed and conveyed through work zone positions 108B, 108C, 108D, and 108E. The vessel 200 is then either conveyed to a subsequent vessel forming station (not shown), is complete and conveyed away from the vessel forming station, or remains in the vessel forming station 110B and proceeds on a return pathway 'B'. Such precision operation and coordination among the various components of the system can be effectuated and coordinated by implementing a controller 504.

In an exemplary embodiment a pathway labeled 'B' is created when vessels 200 either are fed into star wheel 106B or remain in the vessel forming station 100B after completing pathway 'A'. In either case vessels are indexed to operation wheel 110C-D work zone positions 180F, 108G, 108H, and 108A. The vessels 200 are then conveyed to vessel forming station 100A and indexed through operation wheel 110A-B work zones 180F, 108G, 108H, and 108A.

For purposes of disclosure FIG. 5 pathway 'A' can be referred to as the top or top pathway of the vessel forming stations 100A-B. Referring to FIG. 4A this top pathway is formed by work zones 108B-E. Furthermore, pathway 'B' can be referred to as the bottom or bottom pathway of the vessel forming stations 100A-B. Referring to FIG. 4A this bottom pathway is formed by work zones 180F, 108G, 108H, and 108A.

In another exemplary embodiment, operation wheels 110A-B and/or 1004C-D can be indexed in a clockwise direction to form a forward top pathway 'A' through work zones 108B-E or indexed in a counterclockwise direction to form a forward bottom pathway through work zones 108A, 108H, 108G, 108F. This forward indexing top or bottom pathway capability effectuates the ability to perform different operations to the vessel 200, as may be required and/or desired in a particular embodiment. For example and not a limitation, different vessel 200 shaping options can be selected based on whether the clockwise indexed top pathway through work zones 108B-E is selected or the counterclockwise bottom pathway through work zones 108A, 108H, 108G, 108F is selected. Likewise, options and variations for performing smoothing, top forming, printing, laser marking, etching, embossing, de-embossing, or other operations as may be required and/or desired in a particular embodiment can be effectuated using selectively top and bottom pathways.

For purposes of disclosure the operation wheels 110A-D are shown performing operations on a vessel, while the vessel is in the horizontal direction. In a plurality of embodiment the operation wheels can perform operations on the vessel with the vessel orientated in any axis. In this regard, the vessel can be shaped while in the horizontal, vertical, or other axis orientation as may be required and/or desired in a particular embodiment.

Figure 6:
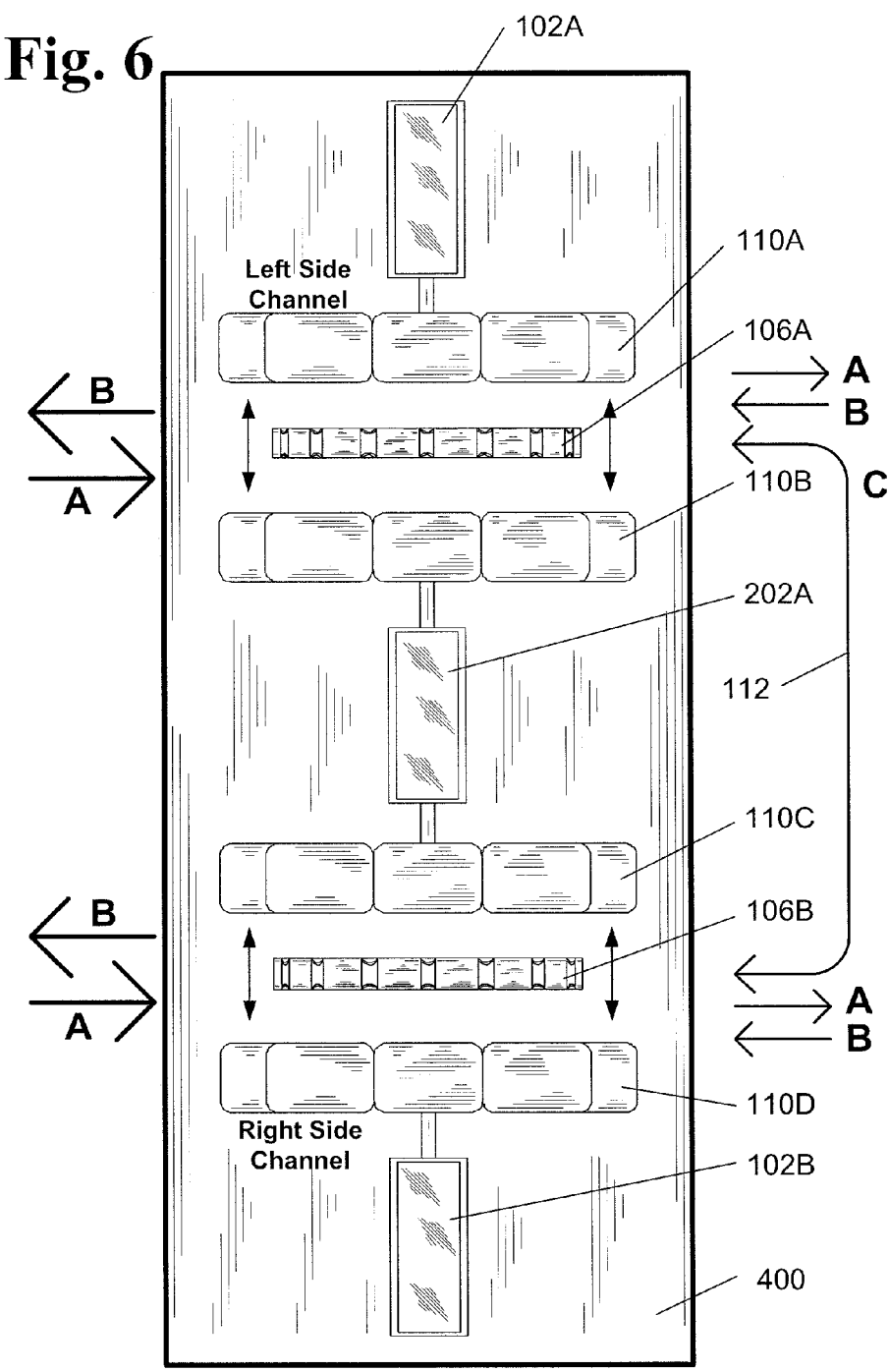
FIG. 6 illustrates one example of a top view of a double channel vessel forming station 400 having at least three linear drives 102A-C, which move operation wheels 110A-B along a plane in opposing directions to close and operate on a vessel and then separate allowing the vessel to be freely indexed to a next position. Two star wheels 106A-B positioned between the operation wheels 110A-B and 110C-D are used to transport a plurality of vessels in-through-and-out of the vessel forming station 400 along pathways 'A' and/or 'B', which are configurable.

Referring to FIG. 6 there is illustrated one example of a top view of a double channel vessel forming station 400 having at least three linear drives 102A-C, which move operation wheels 110A-B along a plane in opposing directions to close and operate on a vessel and then separate allowing the vessel to be freely indexed to a next position. Two star wheels 106A-B positioned between the operation wheels 110A-B and 110C-D are used to transport a plurality of vessels 200 in-through-and-out of the vessel forming station 400 along pathways 'A' and/or 'B', which are configurable.

In an exemplary embodiment, vessel forming station 100 can be reconfigured and constructed as a multi channel vessel forming station 400. An advantage of such a construction is that in addition to having top and bottom pathways along operation wheels 110A-D, the vessel forming station also has a left side channel and a right side channel as indicated in FIG. 6. This multi channel functionality increases the capacity and throughput capabilities of the production line. In addition, additional vessel 200 pathways can be created which increases the configurable flexibility of the production line and increases mass customization options.

Shown in FIG. 6 is a multi channel vessel forming station 400. Vessels can enter the station 400 by way of pathways 'A' or 'B'. In addition, pathway 'C' can be configured to provide a return pathway, wherein vessels 200 exit one channel and enter the other. In operation star wheels 106A-B can be utilized to index vessels clockwise or counterclockwise allowing for top and bottom pathway routing in the forward or return direction. These configurations are selectable and effectuate the ability to customize the operation of the station 400 to perform vessel 200 handling, forming operations, staging operations such as trimming, smoothing, top forming, printing, laser marking, etching, embossing, de-embossing, and/or other operations as may be required and/or desired in a particular embodiment.

Vessel forming station 400 can be grouped proximate to a plurality of stations 100 or other stations 400 to create a highly customizable production line for shaped vessels. Such precision operation and coordination among the various components of the system can be effectuated and coordinated by implementing a controller 504. For disclosure purposes vessel forming station 100 and multi channel vessel forming station 400 can be interchangeably referred to as a vessel forming station, a vessel forming station 400, a vessel forming station 100, 400, station 400, station 100, or station 100, 400.

For purposes of disclosure the operation wheels 110A-D are shown performing operations on a vessel, while the vessel is in the horizontal direction. In a plurality of embodiment the operation wheels can perform operations on the vessel with the vessel orientated in any axis. In this regard, the vessel can be shaped while in the horizontal, vertical, or other axis orientation as may be required and/or desired in a particular embodiment.

Referring to FIG. 7A there is illustrated one example of a plurality of operation wheels 110A-C configured with a die set 'A' illustrating how in an exemplary embodiment a cylinder 200 can be conveyed by conveyor 114 into operation wheel 110A at position 108C and sequentially indexed clockwise through each of a plurality of shape forming dies 'A' and then conveyed from wheel 110A to wheel 110B, and then conveyed from wheel 110B to wheel 110C, exiting as a shaped vessel 200 from wheel 110C at location 108F. In an exemplary embodiment, wheels 110A-C remain stationary and star wheels 106 (not shown) or other conveyer system positioned in front of each wheel 110 transport the vessel 200 from one operating position to another.

In an exemplary embodiment vessels 200 can be conveyed and enter the vessel forming station 100, 400. A plurality of vessel forming stations 100, 400 can be configured proximate to one another. In this regard, a plurality of operation wheels 110A-C (shown) or more operation wheels 110, as may be required and/or desired in a particular embodiment, can be added. These operation wheels 110 are available to perform operations on vessel 200. Typically, the operation wheels 110 remain stationary and fixed in position only being driven linearly to engage and operate on the vessel 200 and then return to an open or home position. In this regard, a star wheel can then index the vessel 200 moving it from its current operation wheel 110 work zone 108 position to the next desired operation wheel 110 work zone 108 position.

Illustrated in FIG. 7A are three operation wheels 110A-C. In operation each wheel 110A, 110B, and 110C represent at least two operation wheels such as is shown in FIG. 6 110A-B. As a vessel 200 is indexed into position between the pair of operation wheels the linear drives 202 cause the operation wheels 110 to engage the vessel, perform an operation such as forming, smoothing, trimming, printing, or other operation and then disengaging the vessel 200 so that the vessel 200 can be indexed to the next work zone 108 position. FIG. 7A illustrates how such a vessel 200 can, in an exemplary embodiment, follow the top pathway labeled 'A' across a plurality of operation wheels 110A-C to produce a shaped vessel 200.

For disclosure purposes conveying or indexing can be incremental with a stop or pause at each operation position or can be continuous motion, wherein the star wheel 106 does not stop or pause at each operation position. An advantage of continuous operation higher throughput of manufactured product. As such, conveying and indexing can be incremental with stops or pauses or continuous motion, as may be required and/or desired in a particular embodiment.

Referring to FIG. 7B there is illustrated one example of a plurality of operation wheels 110A-C configured with a shape forming die set 'A' and a shape forming die set 'B' illustrating how, in an exemplary embodiment, a cylinder 200 can be conveyed as cylinder 200A by conveyor 114 into operation wheel 110A at position 108C and sequentially indexed clockwise through each of the plurality of dies 'A', then conveyed from wheel 110A to wheel 110B, and then conveyed from wheel 110B to wheel 110C exiting as a shaped vessel 200C from wheel 110C at location 108F or returning through die set 'B' exiting from wheel 110A at location 108B as shaped vessel 200B. In an exemplary embodiment connected machines use conveyors to transport the vessel 200 from one machine to another. In this regard, conveyors can be used to transfer vessels 200 from one operation wheel 110 to another operation wheel 110, as may be required and or desired in a particular embodiment.

In an alternative exemplary embodiment, vessel 200A can enter wheel 110A at position 108C and be indexed through shape forming die set 'A' exiting as a shaped vessel 200C from wheel 110C position 108F. Unformed vessels can also enter wheel 110C at position 108G and be indexed through shape forming die set 'B' exiting as shaped vessel 200B from wheel 110A at position 108B, effectuating the ability of two different vessel forming processes to occur simultaneously.

In another exemplary embodiment, a top pathway illustrated as pathway 'A' and a bottom pathway illustrated as pathway 'B' can be implemented to allow a single shaped vessel 200 to be produced by passing initially along pathway 'A' and returning through pathway 'B'. Alternatively, two different shaped vessels 200 can be produce by shaping one vessel 200 along pathway 'A' starting at operation wheel 110A position 108C and exiting from wheel 110C position 108F, and shaping a second vessel 200 along pathway 'B' starting at operation wheel 110C position 108G and exiting at operation wheel 110A position 108B.

An advantage of this exemplary embodiment is that a production line configured with a plurality of vessel forming stations 100, 400 can be configured to produce a single shaped vessel along pathway 'A' and pathway 'B' or configured to produce two different shaped vessels 200 one along pathway 'A' and one along pathway 'B'. This flexibility of producing different shaped vessels 200 on the same production line can increase production line efficiency, reduce or eliminate lengthy production line changeovers, and reduce inventory by better managing production needs where only the shaped vessels 200 needed are manufactured.

Another advantage of this exemplary embodiment is that pathway 'A' and pathway 'B' can be configured to produce the same shaped vessel 200. In operation, if vessels 200 are only manufactured along pathway 'A' then the production line is running at one half of capacity. If vessels 200 are manufactured along pathway 'A' and pathway 'B' then the production line is running at full capacity. In this regard, this exemplary embodiment allows the operator of the production line to vary the production volume of vessels 200, as to avoid excessive inventory.

For disclosure purposes conveying or indexing can be incremental with a stop or pause at each operation position or can be continuous motion, wherein the star wheel 106 does not stop or pause at each operation position. An advantage of continuous operation higher throughput of manufactured product. As such, conveying and indexing can be incremental with stops or pauses or continuous motion, as may be required and/or desired in a particular embodiment.

Referring to FIG. 8 there is illustrated one example of a production line configured with a plurality of single channel vessel forming stations 100A-C that receive cylinders 200, by way of a cylinder feeder 506. A controller 504 controls the cylinder feeder 506 and each of the vessel forming stations 100A-C move vessels along pathway 'A' resulting in a shaped vessel 200B. In addition, the controller can data communicate by way of remote data communication interface 502 to a plurality of data processing resources including a plurality of global network based data processing resources.

In an exemplary embodiment, the operation of the vessel forming stations 100A-C, and cylinder feeder 506 can be monitored and controlled by way of a controller 504. Such a controller can be an ALLEN-BRADLEY, ALLEN-BRADLEY COMPACT LOGIX PLC, INDRAMAT, SIEMENS PLC, BOSH-REXROTH MHI, PID CONTROLLER, personal computer (PC), other computer numeric controller, or other controller as may be required and/or desired in a particular embodiment.

Remote system control, monitoring, and management can be effectuated by way of remote data communication interface 502. Such an interface 502 can be utilized to configure the operation of the production line, remotely monitor the operational efficiency of the production line, and/or control or monitor other aspects of the production line. In addition, such an interface 502 can be utilized to control the operation of the production line, upload and/or download configuration information, or for other purposes as may be required and/or desired in a particular embodiment. Such data communications can be by way of wired or wireless network connection technology, local area networking, wide area networking, intranet based, Internet based, networked with other production line equipment, networked with other data processing devices including global network based data processing devices, or such data communication can be by way of other methods as may be required and/or desired in a particular embodiment. For disclosure purposes the Internet can be referred to as a global network. In an exemplary embodiment interface 502 can utilize SERCOS, TCP/IP, ETHERNET/IP, DEVICENET, PROFIBUS, ASI NET, or other types and/or kind of communication protocols as may be required and or desired in a particular embodiment.

For disclosure purposes FIG. 8 illustrates vessel forming stations 100A-C. In this regard, station 100C represents as many additional stations 100 as are necessary in a particular embodiment. For example, a production line can comprise three, four, five, or any number of vessel forming stations 100, as may be required or desired to effectuate the manufacture of vessel 200 and in a plurality of exemplary embodiment a varying number of vessel forming stations 100 can be implemented. In general, the concept of adding vessel forming stations 100, 400 and/or operation wheels 110 as required and/or desired in a particular embodiment to meet design, performance, or other specification can be applied to the production lines, star wheel, operation wheel, and work zone embodiments depicted throughout this specification.

Referring to FIG. 9 there is illustrated one example of a production line configured with a plurality of multi channel vessel forming stations 400A-E that receive cylinders 200A-B, from a plurality of cylinder feeders 506A-B. A controller 504 controls the cylinder feeders 506A-B and each vessel forming station 400A-E to move cylinders along pathway 'A' and/or pathway 'B' resulting in shaped vessels 200C and 200D respectively. In addition, the controller 504 can data communicate by way of remote data communication interface 502 to a plurality of data processing resources including a plurality of global network based data processing resources.

In an exemplary embodiment a plurality of vessel forming stations can be configured to form a pathway 'A' and a pathway 'B'. In this regard, pathway 'A' can be located on the left hand side of the vessel forming station 400 and have a top pathway and a bottom pathway as illustrated in FIG. 7B. Similarly, pathway 'B' can be located on the right hand side of the vessel forming station 400 and have a top pathway and a bottom pathway.

In operation, full capacity of a single type or kind of vessel 200 can be manufactured when cylinder 200A-B are the same and the vessel forming stations 400A-E are configure such that pathway 'A' and 'B' manufacture the same type or kind of vessel 200. Alternatively, vessel forming stations 400A-E can be operated at half capacity when a vessel 200 is manufactured on only one pathway 'A' or pathway 'B'. In this half capacity mode of operation an advantage can be that two different types or kinds of vessels 200A and 200B can be manufactured at the same time, wherein vessel 200A is different from vessel 200B. In this regard, for example and not a limitation 250 ml shaped vessels 200A can be manufactured on pathway 'A' while 350 ml shaped vessels 200B can be manufactured on pathway 'B'.

In another exemplary embodiment, pathway 'A' can be configured to manufacture one version of vessel 200A along the top pathway and manufacture a second version of vessel 200A along the bottom pathway. In this regard, pathway 'A' can manufacture two different versions of vessel 200A or the top pathway and bottom pathway can be configured to manufacture the same version of vessel 200A, increasing the manufacturing capacity of a single version of vessel 200A. In a similar fashion, pathway 'B' can be configured to have a top pathway and a bottom pathway. In this regard, like pathway 'A', pathway 'B' can also make two version of vessel 200D or an increased manufacturing capacity of a single version of vessel 200D depending on configuration.

In this exemplary embodiment, top and bottom pathway 'A' and top and bottom pathway 'B' can be configured to effectuate the ability to product at one quarter capacity up to four versions of vessels, or be configured to provide three versions of vessels one at up to half capacity and the other two at up to one quarter capacity. In addition, two versions of vessels can be manufactured each at up to half capacity, or a single version of a vessel can be manufactured at up to full capacity. As such, the production line illustrated in FIG. 9 being monitored, operated, or otherwise controlled by way of controller 502 and cylinder feeders 506A-B can be configure in a plurality of combinations to effectuate a plurality of vessel 200 manufacturing configuration, as may be required and/or desired in a plurality of exemplary embodiments.

For disclosure purposes FIG. 9 illustrates vessel forming stations 400A-E. In this regard, station 400E represents as many additional stations 400 as are necessary in a particular embodiment. For example, a production line can comprise three, four, five, or any number of vessel forming stations 400, as may be required and/or desired to effectuate the manufacture of vessel 200 and in a plurality of exemplary embodiment a varying number of vessel forming stations 400 can be implemented. In general, the concept of adding vessel forming stations 100, 400, star wheels 106, and/or operation wheels 110 as required and/or desired in a particular embodiment to meet design, performance, or other specification can be applied to the production line and operation wheel embodiments depicted throughout this specification.

Referring to FIG. 10 there is illustrated one example of a production line with a plurality of multi channel vessel forming stations 400A-D that receive cylinders 200A and 200D, from a plurality of cylinder feeders 506A-B. A controller 504 controls the cylinder feeders 506A-B and each vessel forming station 400A-D move cylinders along pathway 'A' and/or 'B' resulting in shaped vessels 200B-C respectively. In addition, the controller can data communicate by way of remote data communication interface 502 to a plurality of data processing resources including a plurality of global network based data processing resources.

In an exemplary embodiment, a top pathway 'A' and a bottom pathway 'B' can be configured to manufacture shaped vessels 200B-C by way of a single channel of a multi channel vessel forming production line. Alternatively, a pathway 'A' can be configured to manufacture vessel 200C by way of one channel in a multi channel vessel forming line and a pathway 'B' can be configured to manufacture vessel 200B by way of a second channel in a multi channel vessel forming production line. A controller 504 can monitor, operate, or otherwise control the cylinder feeders 506A-B and the vessel forming stations 400A-D. In addition, controller 504 can be interconnected with a remote data communication interface 502. In this regard, the production can be monitored, operated, or otherwise controlled by remote data processing resources as may be required and/or desired in a plurality of exemplary embodiments.

Referring to FIG. 11 there is illustrated one example of a production line with a plurality of multi channel vessel forming stations 400A-D that receive cylinders 200A from a cylinder feeder 506A. A controller 504 controls the cylinder feeder 506A and each vessel forming station 400A-D to move cylinders along pathway 'A' looping on a return pathway at vessel forming station 400D resulting in shaped vessel 200B. In addition, the controller can data communicate by way of remote data communication interface 502 to a plurality of data processing resources including a plurality of global network based data processing resources.

In an exemplary embodiment a production line having a plurality of vessel forming stations 400A-D can be configured to provide a return pathway for the manufacture of vessel 202B. In this regard, a top pathway and bottom pathway of a single channel of a multi channel production line can be configured to return the vessel to the initial starting end of the production line. In this regard, additional operations along the bottom return pathway are optional and performed as may be required and/or desired in a particular embodiment. If no such further operations are needed on the return pathway then the vessel 202B can be indexed through the production line to a return position destination with no further operations being performed.

In another exemplary embodiment a forward pathway through one channel of a multi channel production line can be used to shape the vessel. The vessel can then be returned to the destination position by way of a second channel. In this regard, additional operations along the return pathway are optional and performed as may be required and/or desired in a particular embodiment. If no such further operations are needed on the return pathway then the vessel 202B can be indexed through the production line to a return position destination with no further operations being performed.

One advantage of this type of configuration is that the exit of the shaped vessels 202B is located proximate to the entrance of the unshaped cylinders 202A. As such, a production line can be tailored having a varying number of vessel forming stations 100, 400 and the exit to the next process after the stations 400 is fixed in its physical location. This can effectuate the ability to better plan production floor layout, as physical location of process equipment used after shaping does not vary even if the number of stations 100, 400 varies. In this regard, the return pathway causes the shaped vessels to exit at the same location regardless of the number of stations 400 in the production line.

Figure 12:
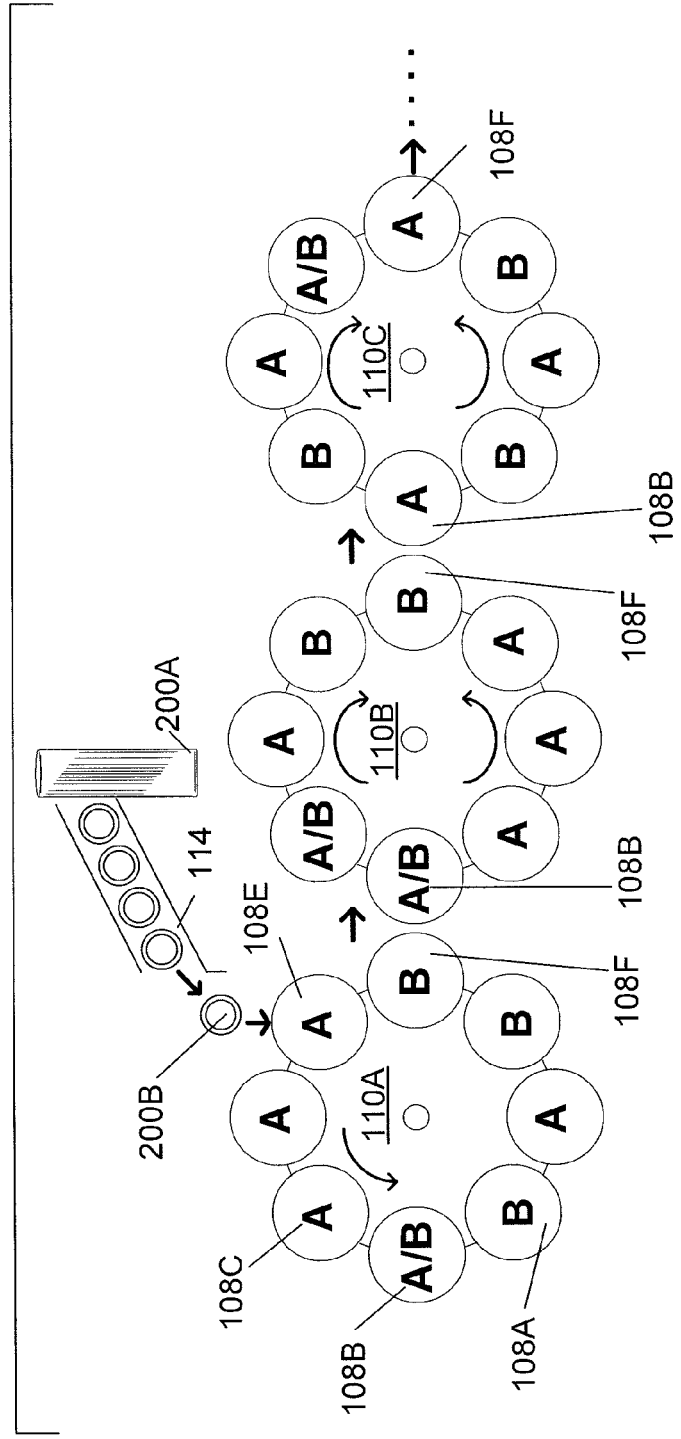
FIG. 12 illustrates one example of a plurality of operation wheels 110A-C configured with shape forming die set 'A' and shape forming die set 'B' that receive cylinder 200A conveyed by conveyor 114 that produce different shaped vessels 200 based in part on the rotational direction (clockwise or counterclockwise) of star wheels moving cylinders across operation wheels 110B-C, wherein a series of 'A', 'B', and 'A/B' dies operate on the cylinders 200 as they are indexed through wheels 110A-C exiting at wheel 110C position 108F.

Referring to FIG. 12 there is illustrated one example of a plurality of operation wheels 110A-C configured with shape forming die set 'A' and shape forming die set 'B' that receive cylinder 200A conveyed by conveyor 114 that produce different shaped vessels 200 based in part on the rotational direction (clockwise or counterclockwise) of star wheels moving cylinders across wheels 110B-C, wherein a series of 'A', 'B', and 'A/B' dies operate on the cylinders 200 as they are indexed through wheels 110A-C exiting at wheel 110C position 108F.

In an exemplary embodiment different shaped vessels 200 can be manufactured based in part on the indexing rotational direction of the star wheels through the operation wheel 110 work zones 108. In this regard, a cylinder 200B enters the star wheel (not shown) which indexes the cylinder through the work zones 108 associated with operation wheel 110A. This operation wheel 110A, for example and not a limitation, utilizes the star wheel to index to the desired work zone position 108. Some positions may be skipped as that operation is not needed for the vessel 200 being shaped. As an example if die set 'A' is being used then operation wheel 110, position 108A would be skipped as it is configured for a shape forming die set 'B'.

When operation wheel 110A is complete the cylinder can be conveyed to operation wheel 110B. A determination can then be made to index the star wheel associated with operation wheel 110B clockwise through the top pathway or counterclockwise through the bottom pathway. An advantage is that based in part on the indexing rotational direction of star wheel 106 (not shown) through a top or bottom pathway, the cylinder can follow two different pathways and as such be operated on by two different sets of operations. This feature can allow for manufacturing variations during the vessel shaping process. Such manufacturing variations can include, for example and not a limitation, different shaping operations, different smoothing operations, different trimming operations, different print, laser marking, etching, embossing, de-embossing operations, different top forming operations, or other manufacturing variation operations as may be required and/or desired in a particular embodiment.

In an exemplary embodiment once operation wheel 110B is complete the cylinder can be conveyed to operation wheel 110C, wherein a determination can again be made as to index the cylinder clockwise through a top pathway of counterclockwise through a bottom pathway to perform different manufacturing variation operations. An advantage of being able to selectively determine the indexing operation of a plurality of operation wheels is that each wheel provides two addition pathways. As such, a production line having two bi-directional indexing star wheels has four manufacturing variations available and a production line having three bi-directional indexing star wheels has six manufacturing variations available.

For disclosure purposes FIG. 12 illustrates three operation wheels 110A-C; however any number of operation wheels 110 can be combined and indexed in a single or bi-directional manner to create any number of manufacturing variations, as may be required and/or desired in a plurality of exemplary embodiments.

For disclosure purposes conveying or indexing can be incremental with a stop or pause at each operation position or can be continuous motion, wherein the star wheel 106 does not stop or pause at each operation position. An advantage of continuous operation higher throughput of manufactured product. As such, conveying and indexing can be incremental with stops or pauses or continuous motion, as may be required and/or desired in a particular embodiment.

Figure 13:
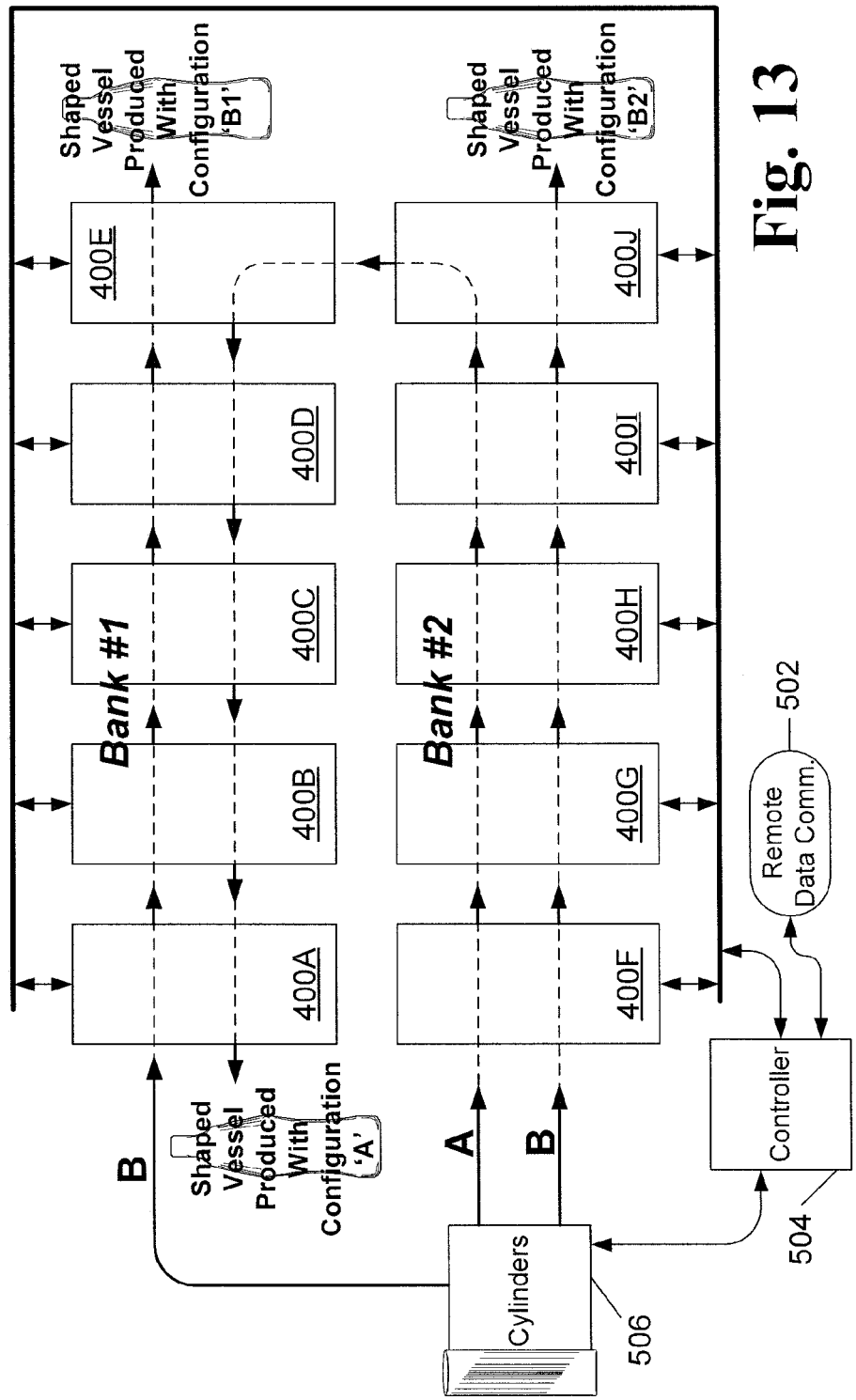
FIG. 13 illustrates one example of a production line that is configurable to produce at least three shaped vessel configurations based in part on the routing pathway selected. In this regard, a plurality of multi channel vessel forming stations 400A-J receive cylinders from a cylinder feeder 506 along pathway 'A' and/or pathway 'B'. The cylinders are indexed through the vessel forming stations, operated upon, and exit through at least one of the pathways 'A', 'B1', and/or 'B2'.

Referring to FIG. 13 there is illustrated one example of a production line that is configurable to produce at least three shaped vessel configurations based in part on the routing pathway selected. In this regard, a plurality of multi channel vessel forming stations 400A-J receive cylinders from a cylinder feeder 506 along pathway 'A' and/or pathway 'B'. The cylinders are indexed through the vessel forming stations, operated upon, and exit through at least one of the pathways 'A', 'B1', and/or 'B2'.

In an exemplary embodiment a plurality of multi channel vessel forming stations can be organized into a matrix configuration. FIG. 13 illustrates a matrix configuration of five stations per bank by two banks of stations for a total of ten vessel forming stations. Other matrix configurations can be utilized such as a three station by four bank, or a two station by three bank, or other matrix configuration as may be required and/or desired in a particular embodiment.

Once the matrix configuration is determined a plurality of pathways can be implemented to produce different shaped vessel configurations and/or variations, as may be required and/or desired in a particular embodiment. In an exemplary embodiment, illustrated in FIG. 13 there can be a first pathway 'A', wherein cylinders are fed from cylinder feeder 506 through bank #2 starting at station 400F and exiting on a return pathway at station 400A, having manufactured a shaped vessel with configuration 'A'. Such a pathway 'A' can utilize top or bottom pathways and can utilize single or dual channel pathways. A second pathway can originate with cylinders being fed from cylinder feeder 506 through bank #1 starting at station 400A and exiting at station 400E, having manufactured a shaped vessel with configuration 'B1'. Such a pathway 'B' through bank #1 can utilize top or bottom pathways and can utilize single or dual channel pathways. A third pathway can originate with cylinders being fed from cylinder feeder 506 through bank #2 starting at station 400F and exiting at station 400J, having manufactured a shaped vessel with configuration 'B2'. Such a pathway 'B' through bank #2 can utilize top or bottom pathways and can utilize single or dual channel pathways.

In an exemplary embodiment selection of pathways and manufacturing variations can be controlled by controller 504. In this regard, controller 504 controls each of the stations 400A-J and cylinder feeder 506. In addition, the controller can data communicate by way of remote data communication interface 502 to a plurality of data processing resources including a plurality of global network based data processing resources.

Figure 14:
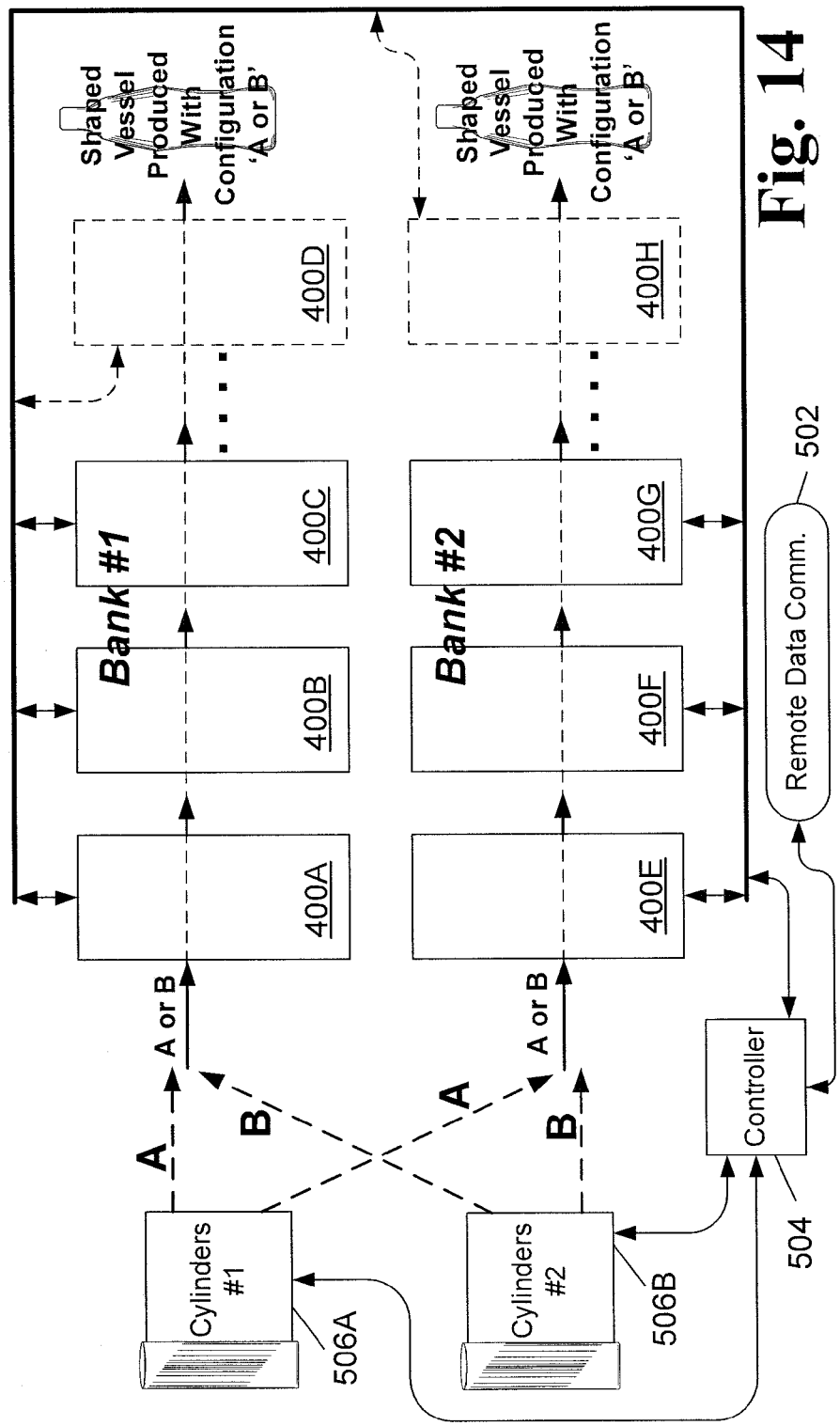
FIG. 14 illustrates one example of a production line that is configurable to produce shaped vessels 'A' or 'B', wherein a plurality of cylinder feeders 506A-B having different types and/or kinds of cylinders are selectable and configurable to feed along pathway 'A' and/or 'B' based on needs, demand, programming, and other considerations.

Referring to FIG. 14 there is illustrated one example of a production line that is configurable to produce shaped vessels 'A' or 'B', wherein a plurality of cylinder feeders 506A-B having different types and/or kinds of cylinders are selectable and configurable to feed along pathway 'A' and/or 'B' based on needs, demand, programming, or other considerations.

In an exemplary embodiment a plurality of multi channel vessel forming stations can be organized into a matrix configuration. FIG. 14 illustrates a matrix configuration of four stations per bank by two banks of stations for a total of eight vessel forming stations. Other matrix configurations can be utilized such as a three station by four bank, or a two station by three bank, or other matrix configuration as may be required and/or desired in a particular embodiment.

Figure 15:
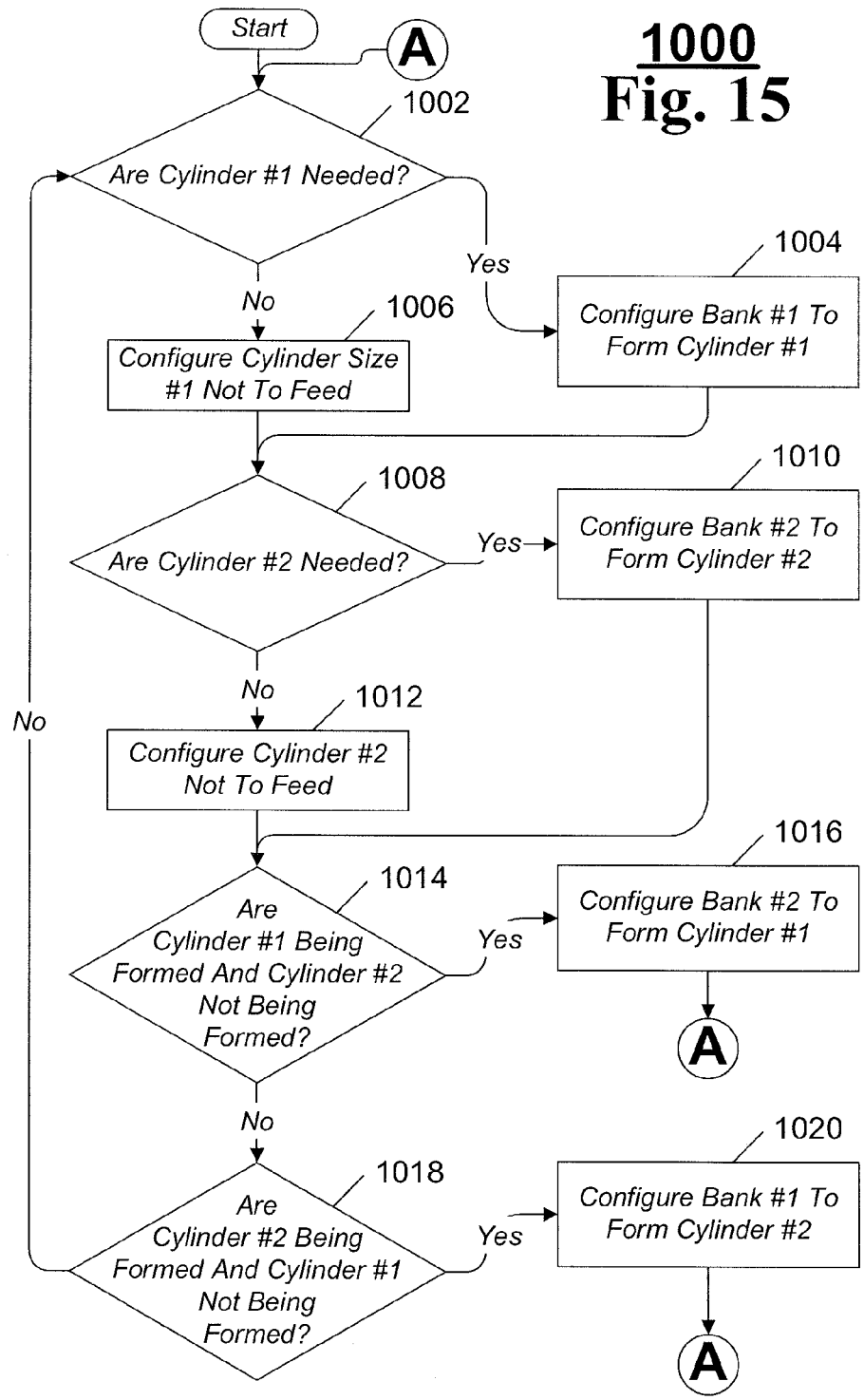
FIG. 15 illustrates one example of a method of how a plurality of cylinder feeders can be configured to automatically transition between no, half, and full capacity shape forming production volumes based in part on needs, demand, programming, or other considerations.

Once the matrix configuration is determined a plurality of pathways can be implemented to produce different shaped vessel configurations and/or variations, as may be required and/or desired in a particular embodiment. In an exemplary embodiment, illustrated in FIG. 14 there can be a first pathway 'A' having station 400 entry pathways at either station 400A and/or 400E. A second pathway 'B' having station 400 entry pathways at either station 400A and/or 400E. In this regard, based in part on type, kind, and/or quantity of vessels needing to be manufactured from types or kinds of cylinder #1 or cylinder #2, pathways into the production line from cylinder feeders 506A-B can be determined. In this regard, for example and not a limitation none, varied capacity from none to full capacity of each of the cylinder #1 and cylinder #2 can be manufactured as demand requires. FIG. 15 is an example of one method for operating such a production line as depicted in FIG. 14.

In an exemplary embodiment selection of pathways and manufacturing variations can be controlled by controller 504. In this regard, controller 504 controls each of the stations 400A-J and cylinder feeders 506A-B. In addition, the controller can data communicate by way of remote data communication interface 502 to a plurality of data processing resources including a plurality of global network based data processing resources.

Referring to FIG. 15 there is illustrated one example of a method of how a plurality of cylinder feeders can be configured to automatically transition between no, half, and full capacity shape forming production volumes based in part on needs, demand, programming, or other considerations. In an exemplary embodiment, the production line illustrated in FIG. 14 can be operated by way of this method. Operation begins in decision block 1002.

In decision block 1002 a determination is made as to whether or not cylinder #1 is needed. If the resultant is in the affirmative that is cylinder #1 is needed then operations move to block 1004. If the resultant is in the negative that is cylinder #1 is not needed then operations move to block 1006.

In block 1004 bank #1 is configured to manufacture vessels from cylinder #1 supply stocks. Operations then move to decision block 1008.

In block 1006 cylinder #1 is configured by way of cylinder feeder 506A illustrated in FIG. 14 not to feed any cylinders. Operations then move to decision block 1008.

In decision block 1008 a determination is made as to whether or not cylinder #2 is needed. If the resultant is in the affirmative that is cylinder #2 is needed then operations move to block 1010. If the resultant is in the negative that is cylinder #2 is not needed then operations move to block 1012.

In block 1010 bank #2 is configured to manufacture vessels from cylinder #2 supply stocks. Operations then move to decision block 1014.

In block 1012 cylinder #2 is configured by way of cylinder feeder 506B illustrated in FIG. 14 not to feed any cylinders. Operations then move to decision block 1014.

In decision block 1014 a determination is made as to whether or not cylinder #1 is being formed and cylinder #2 is not being formed. If the resultant is in the affirmative that is cylinder #1 is being formed and cylinder #2 is not being formed then operations move to block 1016. If the resultant is in the negative then operations move to decision block 1018.

In block 1016 bank #2 is configured to make shaped vessels using cylinder #1. In this regard, the cylinder #1 feeder is configured to supply bank #2. Operations then return to block 1002.

In decision block 1018 a determination is made as to whether or not cylinder #2 is being formed and cylinder #1 is not being formed. If the resultant is in the affirmative that is cylinder #2 is being formed and cylinder #1 is not being formed then operations move to block 1020. If the resultant is in the negative then operations return to block 1002.

In block 1016 bank #1 is configured to make shaped vessels using cylinder #2. In this regard, the cylinder #2 feeder is configured to supply bank #1. Operations then return to block 1002.

Figure 16:
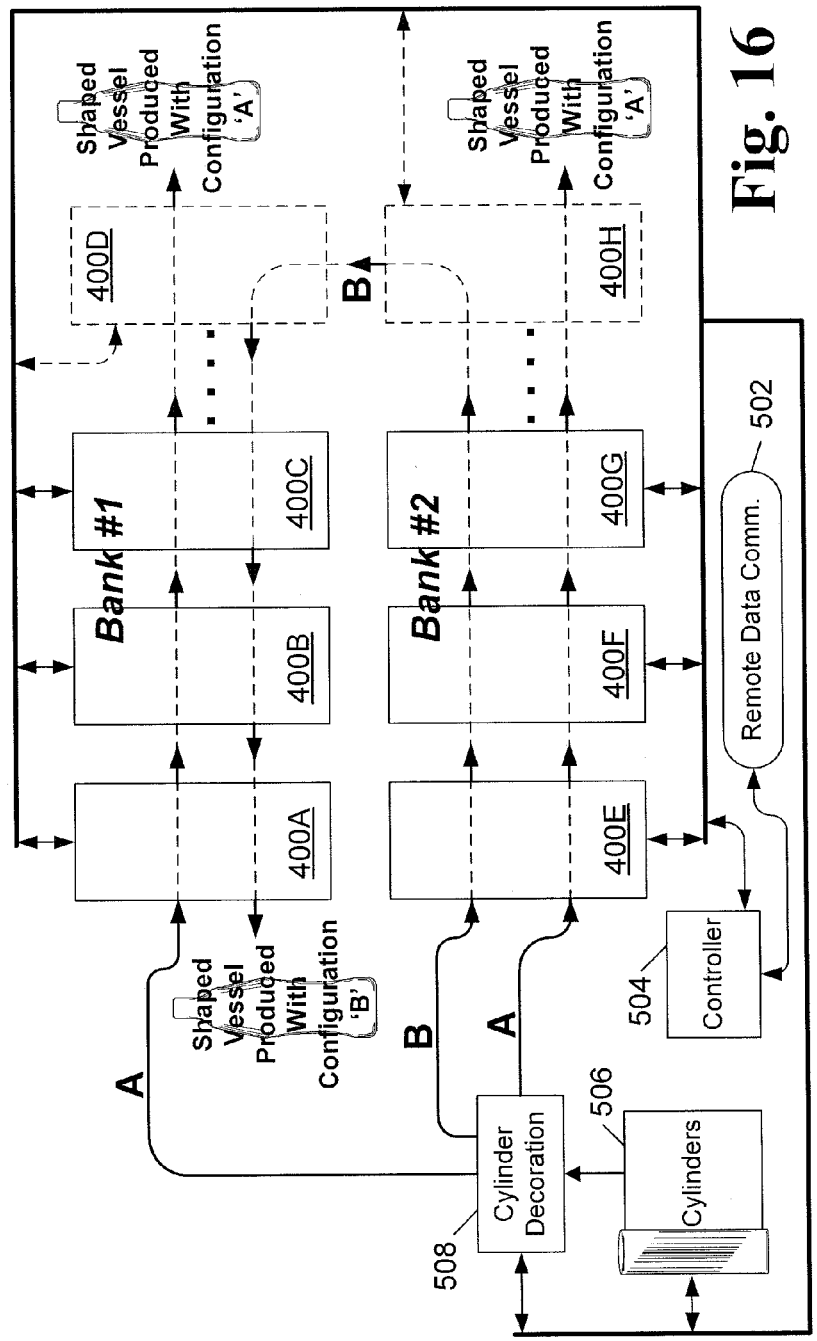
FIG. 16 illustrates one example of a production line wherein cylinders from cylinder feeder 506 are fed to a cylinder decoration station 508. The cylinder decoration station 508 in part decorates the cylinders. Such decoration can be customized on a cylinder by cylinder basis. The cylinders are then fed by way of pathway 'A' and/or pathway 'B' through a plurality of multi channel vessel forming stations 400A-H to produce shaped vessels having an 'A' or 'B' configuration. In addition, the controller can data communicate by way of remote data communication interface 502 to a plurality of data processing resources including a plurality of global network based data processing resources.

Referring to FIG. 16 there is illustrated one example of a production line wherein cylinders from cylinder feeder 506 are fed to a cylinder decoration station 508. The cylinder decoration station 508 in part decorates the cylinders. Such decoration can be customized on a cylinder by cylinder basis. The cylinders are then fed by way of pathway 'A' and/or pathway 'B' through a plurality of multi channel vessel forming stations 400A-H to produce shaped vessels having an 'A' or 'B' configuration. In addition, the controller can data communicate by way of remote data communication interface 502 to a plurality of data processing resources including a plurality of global network based data processing resources.

In an exemplary embodiment a cylinder decoration station 508 can be utilized to decorate cylinders based in part on the pathway in which the cylinders are to be fed. In this regard, cylinder decoration can be mass customized based on a vessel's forming pathway.

An advantage can be that the decoration graphics applied to the cylinders can be selected based in part on the pathway selected to form the vessel. In this regard, pathway 'A' or pathway 'B'. The mass customizability can allow for language, graphics, and other decoration to be varied and applied to the cylinder 200. The cylinder 200 can then be routed based on the decoration applied to one of multiple pathways for shape forming.

Illustrated in FIG. 16 is an exemplary embodiment, for example and not a limitation, of how a decoration station 508 receives cylinders from cylinder feeder 506. A mass customized decoration is then applied to the cylinder. Based in part on the decoration applied the cylinder is then routed to at least one of a pathway 'A' or a pathway 'B'. The vessel 200 is shape formed and a shaped vessel having shape configuration 'A' or 'B' is produced. In this regard, shaped vessels with 'A' configuration can have one type or kind of mass customized decoration applied to the vessel, and shaped vessels with 'B' configuration can have a second type or kind of mass customized decoration applied to the vessel. In addition, the controller 504 can data communicate by way of remote data communication interface 502 to a plurality of data processing resources, including a plurality of global network based data processing resources to coordinate and/or synchronize the decoration being applied and the type or kind of shape forming to be applied to the vessels as may be required and/or desired in a particular embodiment.

Figure 17:
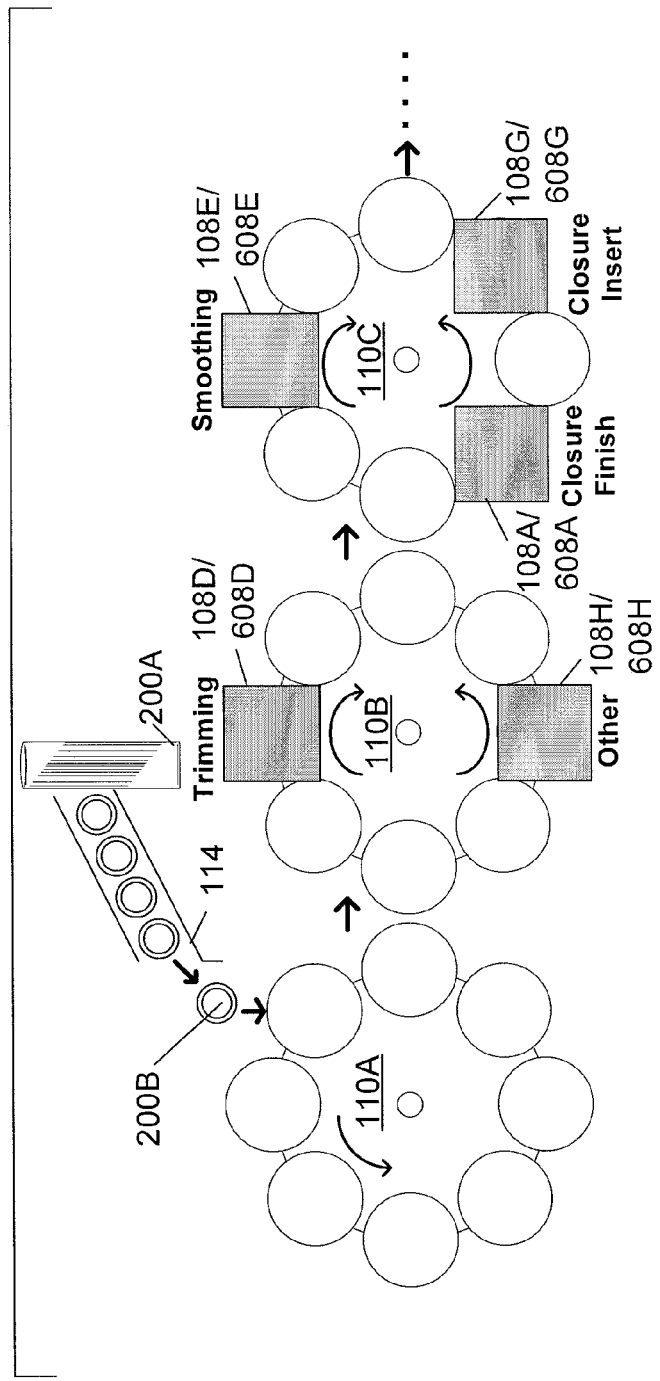
FIG. 17 illustrates one example of how die forming can be interrupted and a different operation such as trimming 608D, smoothing 608E, closure finish 608A, closure insert 608G, other operations 608H, and/or other operations as may be required and/or desired in a particular embodiment can be inserted. In this regard, a non-die forming step can be inserted and used to prepare the vessel for subsequent operations and die forming steps, such that the need for additional post die forming operations are reduced and/or eliminated resulting in a more efficient and more accurate manufacture of shaped vessels. Illustrated is an exemplary embodiment, for example and not a limitation, of how a plurality of operation wheels 110A-C are indexed to transport a cylinder 200A-B through a plurality of work zones 108 and non-die forming operations 608A,D-E,G-H. Also illustrated, for example and not a limitation, is how wheels 110B-C can be indexed clockwise or counterclockwise. In this regard, wheel 110B can be indexed clockwise to access the trim operation 608D or indexed counterclockwise to perform other operation 608H. Furthermore, wheel 110C can be indexed clockwise to access the smoothing operation 608E or indexed counterclockwise to access the closure finish operation 608A and closure insert operation 608G.

Referring to FIG. 17 there is illustrate one example of how die forming can be interrupted and a different operation such as trimming 608D, smoothing 608E, closure finish 608A, closure insert 608G, other operations 608H, and/or other operations can be inserted, as may be required and/or desired in a particular embodiment. In this regard, a non-die forming step can be inserted and used to prepare the vessel for subsequent operations and subsequent die forming steps, such that the need for additional post die forming operations are reduced and/or eliminated resulting in a more efficient and more accurate manufacture of shaped vessels.

Such other operations as 608H can include, for example and not a limitation, applying a vessel strengthening coating, a texture coating, an insulation coating, a powder coating, a metallic coating, other coating, ultra sound seaming, other non-thermal welding, or other operations as may be required and or desired in a particular embodiment. In this regard, a strengthening coating can be applied to the vessel and when cured provides strength to the vessel allowing the vessel to be more resistant to crush or deformation during loading pressure that are typical in the fill and seal processing. Other coatings for texture can be advantageous to the consumer providing a more gripable vessel for on the go consumption. Other specialty coating can include insulation coating that are beneficial to keep the contents within the vessel colder longer resulting in an enhanced consumer experience.

Illustrated is an exemplary embodiment, for example and not a limitation, of how a plurality of operation wheels 110A-C are indexed to transport a cylinder 200A-B through a plurality of work zones 108 and non-die forming operations 608A,D-E,G-H. Also illustrated, for example and not a limitation, is how wheels 110B-C can be indexed clockwise or counterclockwise. In this regard, wheel 110B can be indexed clockwise to access the trim operation 608D or indexed counterclockwise to perform other operation 608H. Furthermore, wheel 110C can be indexed clockwise to access the smoothing operation 608E or indexed counterclockwise to access the closure finish operation 608A and closure insert operation 608G.

Figure 23:
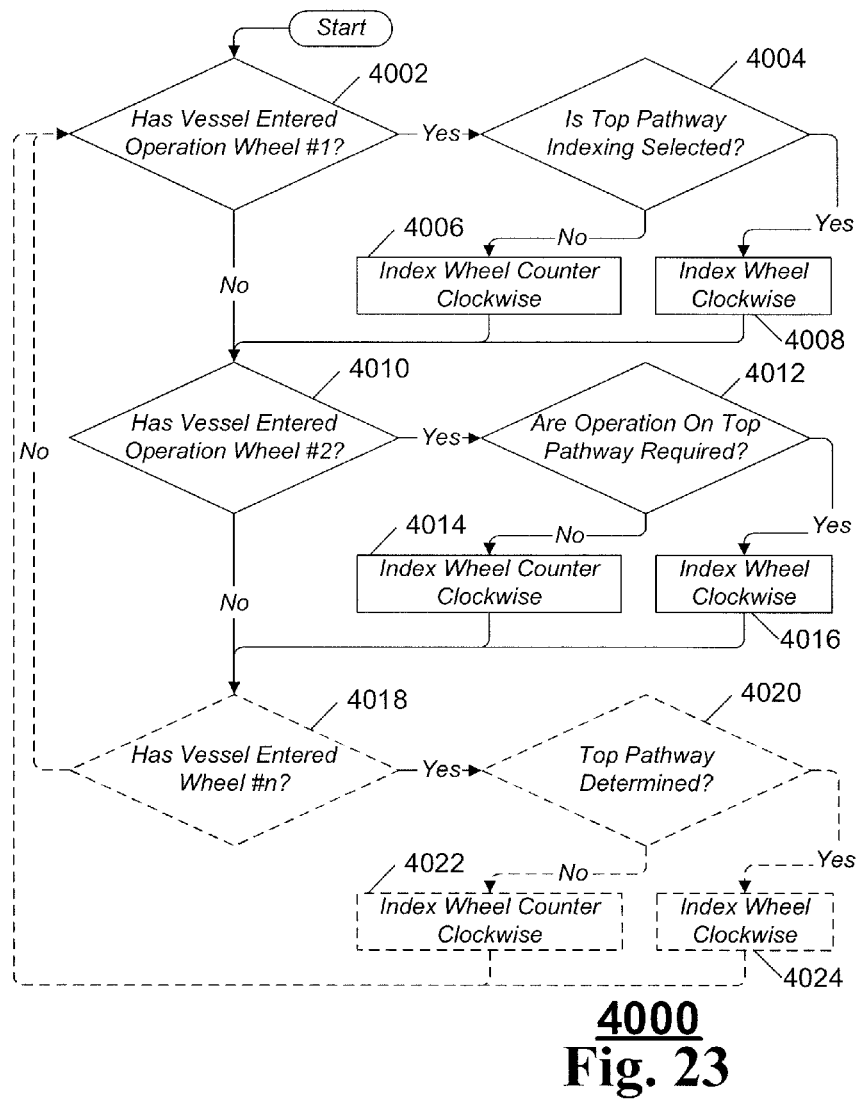
FIG. 23 illustrates one example of a method of forming vessels by indexing through operation work zones including selectively determining to index vessels clockwise or counterclockwise to effectuate selection of the appropriate vessel shaping operations.

An advantage is that in an exemplary embodiment a star wheels 106 can index cylinders clockwise to perform the operations associated with the top pathway of the operation wheel and index the cylinders counterclockwise to perform the operations associated with the bottom pathway. This flexibility allows for operations to be customized along multiple pathways, wherein controller 504 can determine which operations are required to shape and finish the vessel. This can allow for a single production line to have many different configurable options that can be selectable without requiring setup or excessive equipment changeover. In addition, the ability to configure a production line to utilize selectable multiple pathways by indexing in clockwise or counterclockwise directions increase the type, kind, and configurable shape forming options and operations. This better enables the ability to mass customize the shaped vessels and reduces cost, as a single production line has the capacity, with little if any changeover, to shape form a plurality of different types and/or kinds of vessels 200 as may be required and/or desired in a plurality of different embodiments. FIG. 23 illustrates as an example one method of indexing clockwise or counterclockwise to select top or bottom pathways.

Referring to FIG. 17, in an exemplary embodiment for example and not a limitation, cylinders can enter an operation wheel 110A and be indexed through the various operation wheel 110 work zones 108. The cylinders can then be conveyed to a second operation wheel 110B. A determination can be made as to whether or not to index the cylinders clockwise across the top pathway where trimming can take place at wheel 110B work zone 108D, 608D or to index counterclockwise across the bottom pathway where other operations at wheel 110B work zone 108H, 608H can take place. In this regard, controller 504 can in part determine whether indexing across the top pathway or bottom pathway is required for the vessel. Such determination capability can effectuate the ability to mass customize vessels and change shape configurations on the fly, in lieu of prior art practices requiring production line shutdown for extensive reconfiguration and changeover. In addition, such selectable indexing flexibility better enables various non-die forming shape operations to be inserted into a sequential series of die forming operations. This flexibility effectuates the ability to reduce cost by not requiring separate non-die forming equipment to be used in a past vessel shaping operation and can dramatically improve production line efficiency.

When the cylinders reach the exit position of operation wheel 110B the vessels can be conveyed to operation wheel 110C. Again the indexing direction is selectable. A determination is made as to whether or not the top or bottom pathway is required. If the top pathway is required then clockwise indexing indexes the cylinder across the top pathway where, in this exemplary embodiment example, vessel smoothing can take place at operation wheel 110C work zone position 108E, 608E. If the bottom pathway is required then counterclockwise indexing indexes the cylinder across the bottom pathway where vessel closure fitting and closure insert occurs at operation wheel 110C work zone positions 108A, 608A, and 108G, 608G respectively.

When the cylinders reach the exit position of operation wheel 110C they can be conveyed to subsequent operation wheels or exit to other manufacturing processes.

For disclosure purposes in this exemplary embodiment smoothing across the top pathway and closure fitting and insert across the bottom pathway are illustrated as examples. In a plurality of other exemplary embodiments other operations can be configured across the top pathway and bottom pathway. In this regard, operations selected for top pathway and bottom pathway are selected as a matter of design and are based in part on vessel design requirements, production line design requirement, and/or other considerations. As such, the example operations depicted in FIG. 17 and in other figures throughout this specification are illustrative examples and not a limitation.

For disclosure purposes conveying or indexing can be incremental with a stop or pause at each operation position or can be continuous motion, wherein the star wheel 106 does not stop or pause at each operation position. An advantage of continuous operation higher throughput of manufactured product. As such, conveying and indexing can be incremental with stops or pauses or continuous motion, as may be required and/or desired in a particular embodiment.

Figure 18:
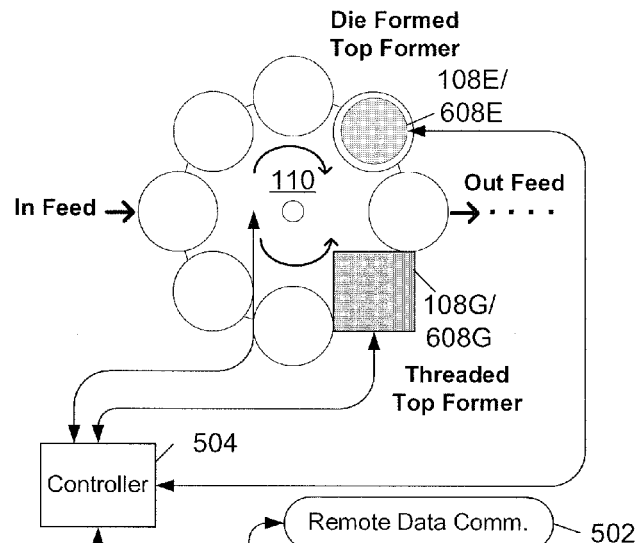
FIG. 18 illustrates one example of how an operation wheel 110 can be indexed to perform at least two different top forming operations resulting in either a die formed top finish (also referred to as die curling) or a threaded top finish. In this regard, under control of controller 504 wheel 110 can be selectively indexed clockwise to access and perform the operation of die-formed top forming 608E or wheel 110 can be selectively indexed counterclockwise to access and perform the operation of threaded top forming 608G. In addition, the controller can data communicate by way of remote data communication interface 502 to a plurality of data processing resources including a plurality of global network based data processing resources.

Referring to FIG. 18 there is illustrated one example of how an operation wheel 110 can be indexed to perform at least two different top forming operations resulting in either a die formed top finish (also referred to as die curling) or a threaded top finish. In this regard, under control of controller 504 wheel 110 can be selectively indexed clockwise to access and perform the operation of die-formed top forming 608E or wheel 110 can be selectively indexed counterclockwise to access and perform the operation of threaded top forming 608G. In addition, the controller can data communicate by way of remote data communication interface 502 to a plurality of data processing resources including a plurality of global network based data processing resources.

For purposes of disclosure die formed top finish can also be referred to as die curling. In addition, threaded top former 608G can include screw type threads such that a closure can be screwed on, jar type threads where a crown type closure or lid can be screwed on, or neck ring finish where the vessel can be carried in manufacture of the shaped vessel. In addition, more then one type of top form can be applied to the vessel. In this regard, for example and not a limitation, a die formed crown finish and a neck ring formed finish can be combined. Alternatively, for example and not a limitation, a threaded top form finish and a neck ring finish can be combined. With regards to the neck ring, this type of top form has advantages of being able to be used to carry the bottle through manufacturing process of vessel shaping as well as through the filling and sealing processed. In this regard, the neck ring can be formed to be similar to the neck ring included on plastic or PET bottles. This can have the advantage of allowing the shaped vessel to be compatible of plastic bottle PET type filling lines. Another advantage is during the sealing process a force is applied to the bottle to apply the closure. This force can be significant resulting in crushing or deforming the vessel. More metal has to be added to the vessel to make it stronger. More metal equals higher cost for the vessel. An advantage of the neck ring top form is that high closure fitting pressure can be limited to the neck ring area is the filling equipment carries the vessel by the neck ring. This can allow for use of less metal as the vessel does not see the crushing forces. The resultant can be a lighter weight, lower cost vessel that can still be sealed with high force closure processes.

In an exemplary embodiment, a controller 504 can control the indexing direction of cylinders across the operation wheel. Such indexing can be performed by a star wheel 106 or other conveyor system. In addition, controller 504 can be utilized to operate a plurality of other operation equipment. Such operation equipment can include, for example and not a limitation, die forming, hydro forming, pressure ram forming, vacuum forming, magnetic impulse forming, trimming, smoothing, printing, etching, laser marking, embossing, de-embossing, top forming, applying outserts or inserts, or other operations as may be required and/or desired in a particular embodiment. The outsert is a finish that is applied over the vessel and positioned on the external surface of the vessel.

Figure 19:
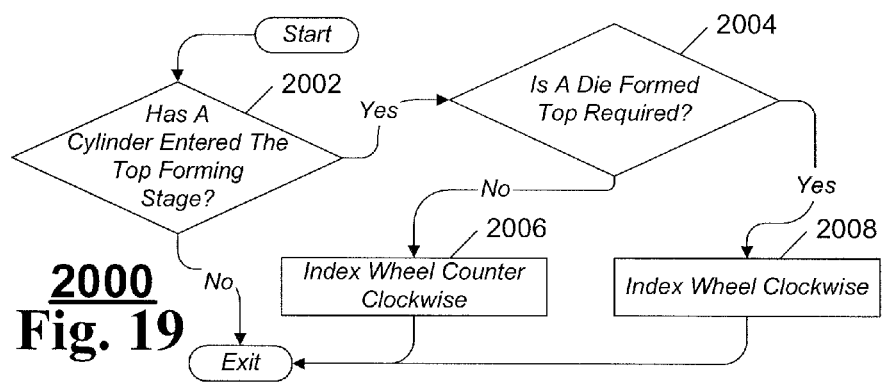
FIG. 19 illustrates one example of a method related to FIG. 18 of determining which top forming operation is required and indexing the wheel 110 clockwise or counterclockwise accordingly.

FIG. 18 illustrates how bidirectional indexing of cylinders better enables different operation to be performed to vessels entering an operation wheel such as operation wheel 110. FIG. 19 illustrates an example method of how based on the type of top forming finish required indexing direction can be determined.

Referring to FIG. 19 there is illustrated one example of a method related to FIG. 18 of determining which top forming operation is required and indexing the wheel 110 clockwise or counterclockwise accordingly. For disclosure purposes 'indexing wheel . . . ' refers to a star wheel 106 or other conveyer system indexing cylinders to the appropriate operation wheel 110 work zones 108 positions, such that the operation wheel 110 can engage the vessel and perform the intended operations. The method begins in decision block 2002.

In decision block 2002 a determination is made as to whether or not a cylinder has entered the top forming stage. If the resultant is in the affirmative that the vessel has entered the top forming stage then operations move to decision block 2004. If the resultant is in the negative that is the vessel has not entered the top forming stage then the method is exited. For purposes of disclosure the top forming stage in this exemplary embodiment example refers to entering the operation wheel 110 illustrated in FIG. 18. In general, an operation wheel 110 having certain operation or work zone 108 characteristics such as forming, top forming, decoration, or other operation or work zone characteristics can be referred to as forming stage, top forming stage, decoration stage, or other stage name as appropriate.

In decision block 2004 a determination is made as to whether or not a die formed top form is required. If the resultant is in the affirmative that is a die formed top form is required then operations move to block 2008. If the resultant is in the negative that is a die formed top form is not required then operations move to block 2006.

In block 2006 the cylinders are indexed counterclockwise across the bottom pathway and through the operation wheel 110 work zone 108G, 608G where a threaded top form operation is perform, as illustrated in FIG. 18. In this regard, the vessels exiting the operation wheel 110 exit with a thread top form. The method is then exited.

In block 2008 the cylinders are indexed clockwise across the top pathway and through the operation wheel 110 work zone 108E, 608E where a die formed top form such as may be required for applications utilizing a crown finish to seal the vessel is perform, as illustrated in FIG. 18. In this regard, the vessels exiting the operation wheel 110 exit with a die formed top form. The method is then exited.

For disclosure purposes conveying or indexing can be incremental with a stop or pause at each operation position or can be continuous motion, wherein the star wheel 106 does not stop or pause at each operation position. An advantage of continuous operation higher throughput of manufactured product. As such, conveying and indexing can be incremental with stops or pauses or continuous motion, as may be required and/or desired in a particular embodiment.

Figure 20:
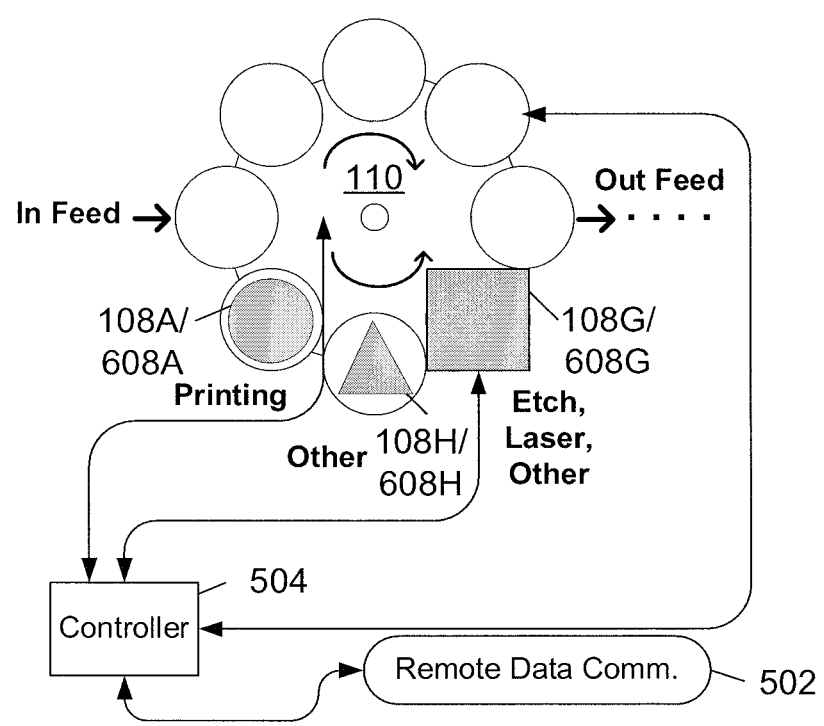
FIG. 20 illustrates one example of an operation wheel 110 configured to index clockwise if no additional cylinder decoration is required. If however additional decoration is required then the wheel 110 is indexed counterclockwise where printing operation 608A, etch/laser marking decoration/labeling 608G, other operations 608H, and/or other operations can be performed as may be required and/or desired in a particular embodiment. Such other operations can include, for example and not a limitation embossing or de-embossing. In an exemplary embodiment, for example and not a limitation, this can effectuate the ability to selectively add or not add decoration or labeling as an operation, while the cylinder is being formed. In addition, the controller 504 can data communicate by way of remote data communication interface 502 to a plurality of data processing resources including a plurality of global network based data processing resources.

Referring to FIG. 20 there is illustrated one example of an operation wheel 110 configured to index clockwise if no additional cylinder decoration is required. If however additional decoration is required then the wheel 110 is indexed counterclockwise where printing operation 608A, etch/laser marking decoration/labeling 608G, other operations 608H, and/or other operations can be performed as may be required and/or desired in a particular embodiment. Such other operation can include, for example and not a limitation, embossing or de-embossing. In an exemplary embodiment, for example and not a limitation, this can effectuate the ability to selectively add or not add decoration or labeling as an operation, while the cylinder is being formed. In addition, the controller 504 can data communicate by way of remote data communication interface 502 to a plurality of data processing resources including a plurality of global network based data processing resources.

In an exemplary embodiment, bidirectional indexing of cylinders can be used to bypass certain operations. In this regard, if additional decoration is required on a cylinder 200 such decoration can be added by way of indexing the cylinder counterclockwise across the bottom pathway. Such indexing would move the cylinders into positions such that, for example and not a limitation, print at position 108A, 608A, other operations at position 108H, 608H, and/or etching, laser marking, embossing, or de-embossing at position 108G, 608G can be effectuated. For purposes of disclosure of importance in this exemplary embodiment is that some, all, or other operations can be performed as vessels are indexed across the bottom pathway. If additional decoration is not required then indexing can be clockwise indexing the cylinders 200 across the top pathway where no additional decoration operations are performed.

Figure 21:
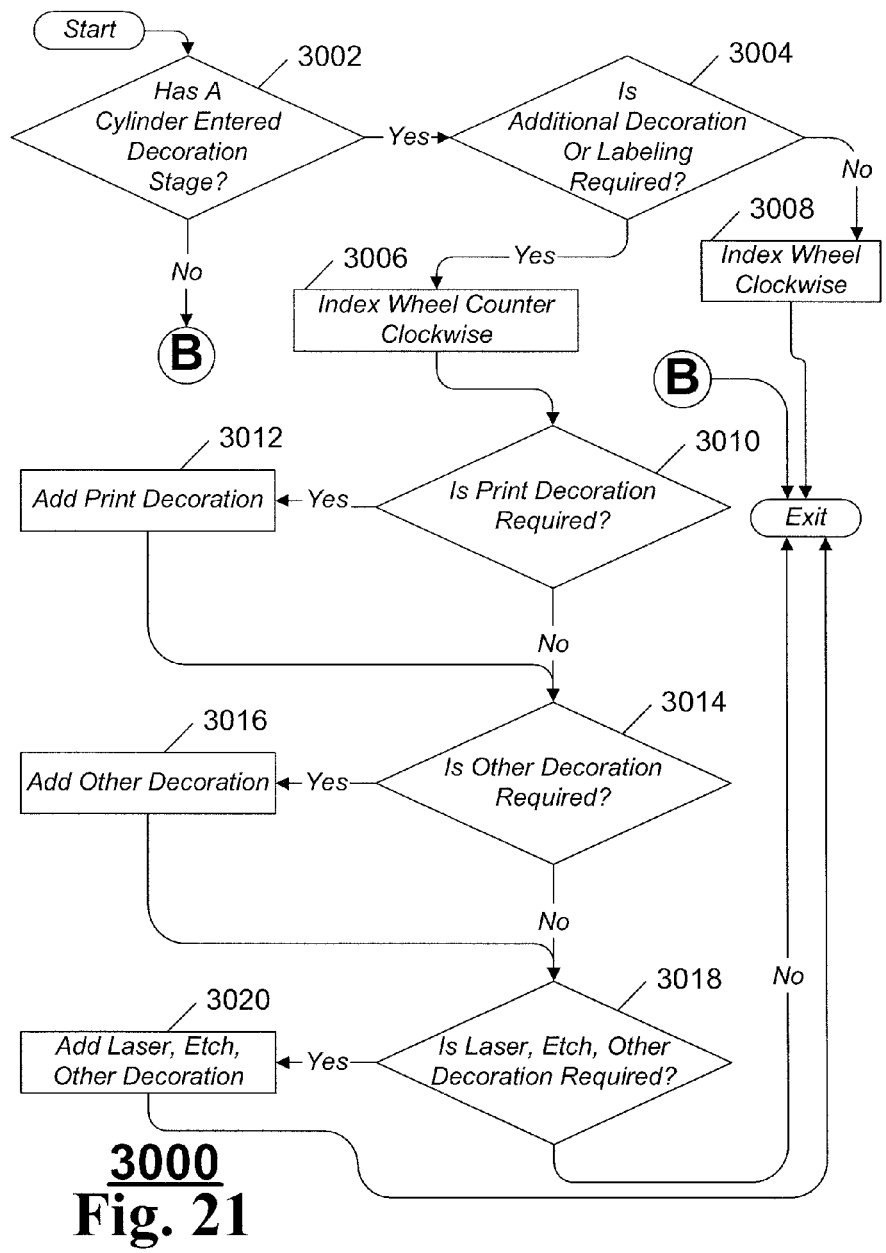
FIG. 21 illustrates one example of a method related to FIG. 20 of selectively indexing wheel 110 to perform or not to perform adding additional decoration and/or labeling to the cylinders.

An advantage is that selectively cylinders can be initially decorated prior to entering into the vessel shaping stations and then after partial vessel shaping additional decoration can be added to the cylinders selectively. The shaping of the vessel can then continue. In an exemplary embodiment, this can effectuate the ability to print on a flat surface prior to contouring the vessel surface, which can results in a clearer image and make used of non-contoured printing techniques. FIG. 21 illustrates a method of selectively indexing bidirectional to add decoration to cylinders, as may be required and/or desired in a particular embodiment.

For disclosure purposes in this exemplary embodiment providing no additional operation across the top pathway and printer, other, laser/etch, embossing, or de-embossing across the bottom pathway are illustrated as examples. In a plurality of other exemplary embodiments other operations can be configured across the top pathway and bottom pathway. In this regard, operations selected for top pathway and bottom pathway are selected as a matter of design and are based in part on vessel design requirements, production line design requirement, and/or other considerations. As such, the example operations depicted in FIG. 20 and in other figures throughout this specification are illustrative examples and not a limitation.

For disclosure purposes conveying or indexing can be incremental with a stop or pause at each operation position or can be continuous motion, wherein the star wheel 106 does not stop or pause at each operation position. An advantage of continuous operation higher throughput of manufactured product. As such, conveying and indexing can be incremental with stops or pauses or continuous motion, as may be required and/or desired in a particular embodiment.

Referring to FIG. 21 there is illustrated one example of a method related to FIG. 20 of selectively indexing wheel 110 to perform or not to perform adding additional decoration and/or labeling to the cylinders. For disclosure purposes 'indexing wheel . . . ' refers to a star wheel 106 or other conveyer system indexing cylinders to the appropriate operation wheel 110 work zones 108 positions, such that the operation wheel 110 can engage the vessel and perform the intended operations. The method begins in decision block 3002.

In decision block 3002 a determination is made as to whether or not a cylinder has entered the decoration stage. If the resultant is in the affirmative that is the cylinder has entered the decoration stage then operations move to decision block 3004. If the resultant is in the negative that is the cylinder has not entered the decoration stage then the method is exited. For purposes of disclosure the decoration stage in this exemplary embodiment example refers to entering the operation wheel 110 illustrated in FIG. 20. In general, an operation wheel having certain operation or work zone characteristics such as forming, or top forming, decoration, or other operation or work zone characteristics can be referred to as forming stage, top forming stage, decoration stage, or other stage name as appropriate.

In decision block 3004 a determination is made as to whether or not additional decoration or labeling is required to be added to the cylinder. If the resultant is in the affirmative that is additional decoration or labeling is required to be added to the cylinder then operations move to block 3006. If the resultant is in the negative that is additional decoration or labeling is not required to be added to the cylinder then operations move to block 3008.

In block 3006 the wheel is indexed counterclockwise along the bottom pathway. Operations move to decision block 3010. In an exemplary embodiment 'indexes the wheel counterclockwise' is effectuated by way of a star wheel or other conveyor indexing vessel 200 in a counterclockwise direction.

In block 3008 the wheel is indexed clockwise along the top pathway. The method is then exited. In an exemplary embodiment 'indexes the wheel clockwise' is effectuated by way of a star wheel or other conveyor indexing vessel 200 in a clockwise direction.

In decision block 3010 a determination is made as to whether or not print decoration is required. If the resultant is in the affirmative that is print decoration is required then operations move to block 3012. If the resultant is in the negative that is print decoration is not required then operations move to decision block 3014.

In block 3012 additional print decoration is added to the cylinder. Operations then move to decision block 3014.

In decision block 3014 a determination is made as to whether or not other decoration is required. If the resultant is in the affirmative that is other decoration is required then operations move to block 3016. If the resultant is in the negative that is other decoration is not needed then operations move to decision block 3018.

In block 3016 additional other decoration is added to the cylinder. Such operations can include, for example and not a limitation, applying a vessel strengthening coating, a texture coating, an insulation coating, a powder coating, a metallic coating, other coating, ultra sound seaming, other non-thermal welding, or other operations as may be required and or desired in a particular embodiment. In this regard, a strengthening coating can be applied to the vessel and when cured provides strength to the vessel allowing the vessel to be more resistant to crush or deformation during loading pressure that are typical in the fill and seal processing. Other coatings for texture can be advantageous to the consumer providing a more gripable vessel for on the go consumption. Other specialty coating can include insulation coating that are beneficial to keep the contents within the vessel colder longer resulting in an enhanced consumer experience. Operations then move to decision block 3018.

In decision block 3018 a determination is made as to whether or not laser marking, etch, embossing, or de-embossing decoration is required. If the resultant is in the affirmative that is additional laser marking, etching, embossing, or de-embossing decorations are required then operations move to block 3020. If the resultant is in the negative, that is additional laser marking, etching, embossing, de-embossing decorations are not required then the method is exited.

In block 3020 additional laser marking, etching, embossing, or de-embossing decorations are added to the cylinder. The method is then exited.

For disclosure purposes conveying or indexing can be incremental with a stop or pause at each operation position or can be continuous motion, wherein the star wheel 106 does not stop or pause at each operation position. An advantage of continuous operation higher throughput of manufactured product. As such, conveying and indexing can be incremental with stops or pauses or continuous motion, as may be required and/or desired in a particular embodiment.

Figure 22:
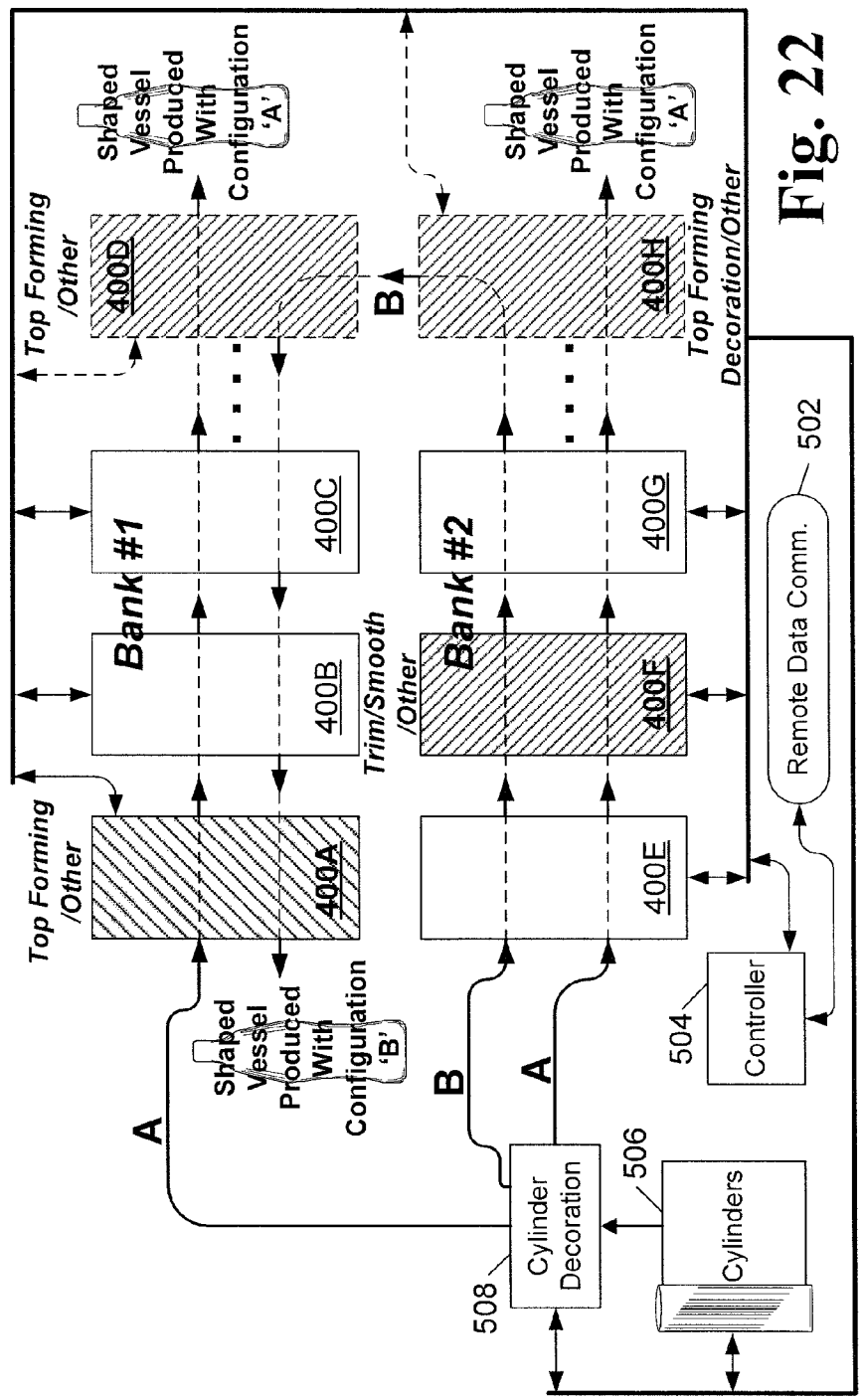
FIG. 22 illustrates one example of a production line having placed a plurality of vessel forming stations 400A-H, wherein some of the vessel forming stations have certain operational capabilities incorporated into the various stages that include top forming operation and other operations. Also illustrated is how an operation such as top forming can be located in several locations of the production line such that whether cylinders follow pathway 'A' and/or pathway 'B' all the necessary operations are performed such that the result is shaped vessels produced with an 'A' and/or 'B' configuration.

Referring to FIG. 22 there is illustrated one example of a production line having placed a plurality of vessel forming stations 400A-H, wherein some of the vessel forming stations have certain operational capabilities incorporated into the various stages that include top forming operation and other operations. Also illustrated is how an operation such as top forming can be located in several locations of the production line such that whether cylinders follow pathway 'A' and/or pathway 'B' all the necessary operations are performed such that the resultant is a shaped vessels produced with an 'A' and/or 'B' configuration.

In an exemplary embodiment, non-die forming operations can be inserted in the production line matrix of vessel forming stations 400A-H. In this regard, duplicate operations such as top forming, for example and not a limitation, can be inserted such that as the pathways vary for vessel shaping each pathway passes through the prerequisite operations to complete vessel shaping and finishing.

As an example and not a limitation, with respect to top forming, top forming operations can be located at station 400A, 400D, and 400H. In operation, regardless of pathway 'A' or pathway 'B' selected each pathway passes through at least one top forming operation. Controller 504 can be utilized, in an exemplary embodiment, to coordinate the operation of the vessel forming stations 400A-H, as well as coordinate the top forming and other operations, such that only the necessary operations are performed on the desired pathway to produce the desired vessel with the desired shaped vessel configuration. Furthermore indexing clockwise and counterclockwise can be employed to direct vessel across a top pathway or bottom pathway to avoid unnecessary operations, as may be required and or desired in a particular embodiment.

As another example, a trimmer or smoother operation can be located at station 400F. In this regard, each of pathways 'A' and 'B' pass through this station and as such, in this exemplary embodiment, there is no need for positioning duplicate processes of trimming or smoothing.

In an exemplary embodiment cylinder decoration station 508, cylinder feeder 506, and vessel forming stations 400A-H are all controlled by controller 504. In addition, the controller 504 can data communicate by way of remote data communication interface 502 to a plurality of data processing resources including a plurality of global network based data processing resources.

Referring to FIG. 23 there is illustrated one example of a method of forming vessels by indexing through operation work zones including selectively determining to index vessels clockwise or counterclockwise to effectuate selection of the appropriate vessel shaping operations. In an exemplary embodiment, as vessels enter an operation wheel 110 a determination can be made base in part of the type and/or kind of shape forming configuration desired to index the vessels clockwise accessing the top pathway or counterclockwise accessing the bottom pathway. Such a determination is controllable by way of controller 504 and can effectuate the ability to mass customized vessel shaping and finishing, without requiring undue changeover time, as required and or desired in a particular embodiment. In addition, the ability to index cylinders in a bidirectional manner creates the ability to vary the shape forming and finish applied to the cylinders, on the fly, in a cylinder by cylinder manner creating mass customization opportunities. For disclosure purposes 'indexing wheel . . . ' refers to a star wheel 106 or other conveyer system indexing cylinders to the appropriate operation wheel 110 work zones 108 positions, such that the operation wheel 110 can engage the vessel and perform the intended operations. The method begins in decision block 4002.

In decision block 4002 a determination is made as to whether or not the vessel has entered operation wheel #1. If the resultant is in the affirmative that is the vessel has entered operation wheel #1 then operations move to decision block 4004. If the resultant is in the negative that is a vessel has not entered operation wheel #1 then operations move to decision block 4010. In an exemplary embodiment, operation wheel #1, #2, and #3 can represent operation wheels such as operation wheels 110A-C in a multiple operation wheel production line. In addition, more or less than three operation wheels can be, utilized. As such, FIG. 23 illustrates a dotted line portion to indicate how such additional operation wheel operation logic can be effectuated, in the methods exemplary embodiment example, by replication of the dotted line portion of the method for other operation wheels. Furthermore, for disclosure purposes indexing wheel refers to indexing by way of star wheel 106 or other conveyor device the cylinders 200 through a series of operation associated with operation wheels #1, #2, and #3 (also referred to as operation wheels 110A-C). In this regard, as an example 'indexing wheel clockwise' refers to indexing the cylinder clockwise to each of the desired operation wheel 110 work zones 108 by way of indexing a star wheel 106 or other conveyer to position the cylinders 200 accordingly.

In decision block 4004 a determination is made as to whether or not the top pathway indexing is selected. If the resultant is in the affirmative that is top pathway indexing is selected then operations move to block 4008. If the resultant is in the negative that is top pathway indexing is not selected then operations move to block 4006. In an exemplary embodiment controller 504 can be programmed to select whether top pathway indexing is required.

In block 4006 the wheel is indexed counterclockwise. Operations then move to decision block 4010. In an exemplary embodiment 'indexing the wheel counterclockwise' is effectuated by way of a star wheel or other conveyor indexing vessel 200 in a counterclockwise direction.

In block 4008 the wheel is indexed clockwise. Operations then move to decision block 4010. In an exemplary embodiment 'indexing the wheel clockwise' is effectuated by way of a star wheel or other conveyor indexing vessel 200 in a clockwise direction.

In decision block 4010 a determination is made as to whether or not the vessel has entered operation wheel #2. If the resultant is in the affirmative that is the vessel has entered operation wheel #2 then operations move to decision block 4012. If the resultant is in the negative that is a vessel has not entered operation wheel #2 then operations move to decision block 4018.

In decision block 4012 a determination is made as to whether or not the top pathway indexing is selected. If the resultant is in the affirmative that is top pathway indexing is selected then operations move to block 4016. If the resultant is in the negative that is top pathway indexing is not selected then operations move to block 4014. In an exemplary embodiment, controller 504 can be programmed to select whether top pathway indexing is required.

In block 4014 the wheel is indexed counterclockwise. Operations then move to decision block 4018. In an exemplary embodiment 'indexing the wheel counterclockwise' is effectuated by way of a star wheel or other conveyor indexing vessel 200 in a counterclockwise direction.

In block 4016 the wheel is indexed clockwise. Operations then move to decision block 4018. In an exemplary embodiment 'indexing the wheel clockwise' is effectuated by way of a star wheel or other conveyor indexing vessel 200 in a clockwise direction.

In decision block 4018 a determination is made as to whether or not the vessel has entered operation wheel #n. If the resultant is in the affirmative that is the vessel has entered operation wheel #n then operations move to decision block 4020. If the resultant is in the negative that is a vessel has not entered operation wheel #n then operations return to decision block 4002. In an exemplary embodiment, the dotted lines portion and reference to 'Wheel #n' of FIG. 23 illustrated how such an example method, in an exemplary embodiment, can be tailored to accommodate more or less operation wheels 110 as may be required and or desired in a particular embodiment. In this regard, the dotted line section of FIG. 23 can be replicated as may be required and/or desired in a particular embodiment to accommodate additional operation wheels.

In decision block 4020 a determination is made as to whether or not the top pathway indexing is selected. If the resultant is in the affirmative that is top pathway indexing is selected then operations move to block 4024. If the resultant is in the negative that is top pathway indexing is not selected then operations move to block 4022. In an exemplary embodiment, controller 504 can be programmed to select whether top pathway indexing is required.

In block 4022 the wheel is indexed counterclockwise. Operations return to decision block 4002. In an exemplary embodiment 'indexing the wheel counterclockwise' is effectuated by way of a star wheel or other conveyor indexing vessel 200 in a counterclockwise direction.

In block 4024 the wheel is indexed clockwise. Operations return to decision block 4002. In an exemplary embodiment 'indexing the wheel clockwise' is effectuated by way of a star wheel or other conveyor indexing vessel 200 in a clockwise direction.

For disclosure purposes conveying or indexing can be incremental with a stop or pause at each operation position or can be continuous motion, wherein the star wheel 106 does not stop or pause at each operation position. An advantage of continuous operation higher throughput of manufactured product. As such, conveying and indexing can be incremental with stops or pauses or continuous motion, as may be required and/or desired in a particular embodiment.

Figure 24:
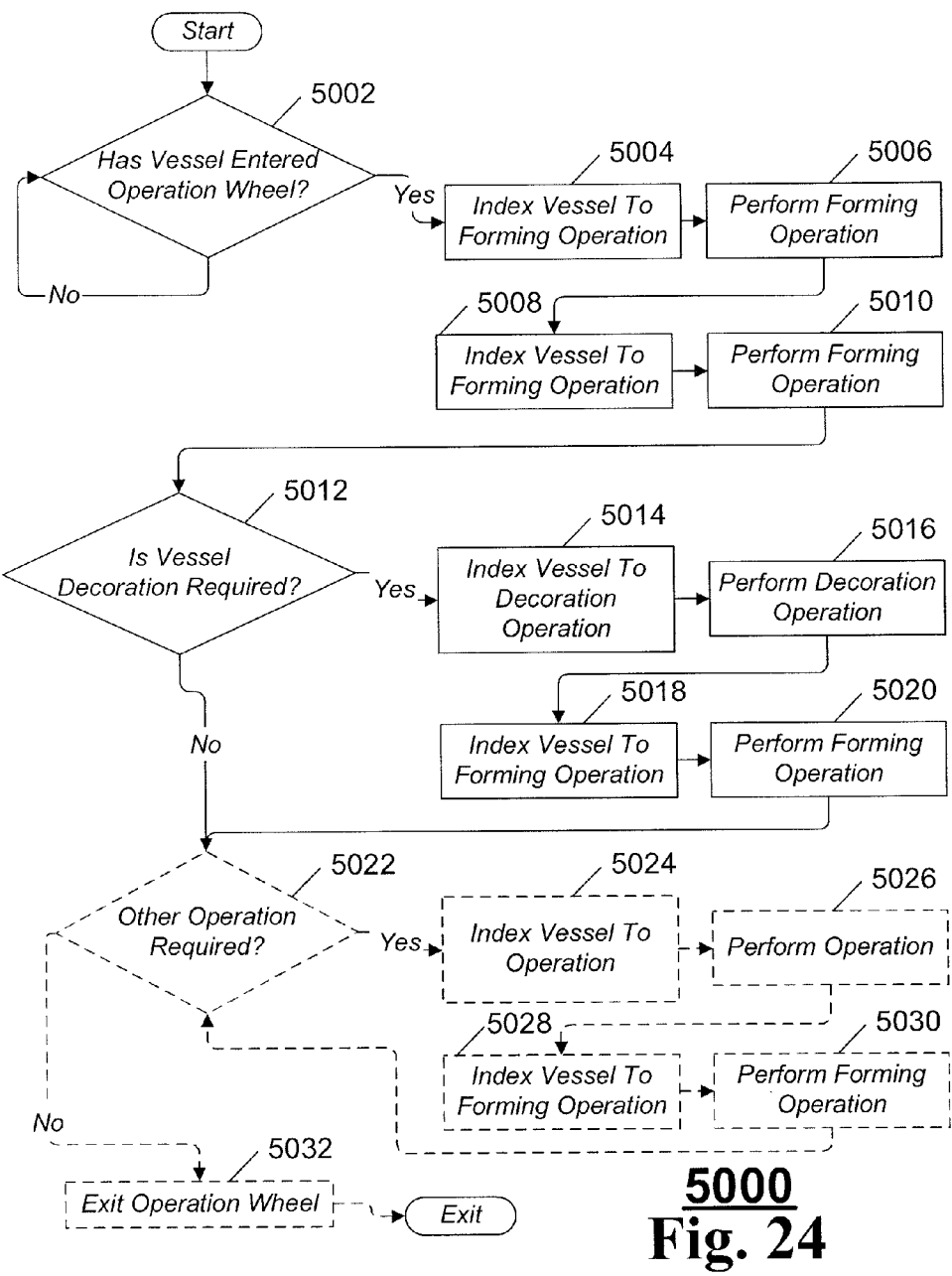
FIG. 24 illustrates one example of a method of mass customization of vessel decoration and/or other operations inserted between vessel shape forming operations.

Referring to FIG. 24 there is illustrated one example of a method of mass customization of vessel decoration and/or other operations inserted between vessel shape forming operations. In an exemplary embodiment, the operation of adding decoration to the cylinder can be performed between shape forming operations.

In an exemplary embodiment, an advantage can be that a vessel can be partially shaped and then the decoration added reducing distortion or smearing of the graphic decoration image that can occur during shaping (if the decoration is first applied to a straight walled cylinder). Once partial shaping followed by decoration application are complete, vessel shaping can resume to completion. This technique not only improves the decoration quality but also combine inserting a decoration operation into a plurality of sequential shaping operations. This can result in a better finished shaped vessel as decorations are not damaged during certain shaping operations and can increase production line efficiency as different operations of shaping and decoration are combined into a single set of operations. For disclosure purposes 'indexing wheel . . . ' refers to a star wheel 106 or other conveyer system indexing cylinders to the appropriate operation wheel 110 work zones 108 positions, such that the operation wheel 110 can engage the vessel and perform the intended operations. The method begins in decision block 5002.

In decision block 5002 a determination is made as to whether or not a vessel has entered the operation wheel. If the resultant is in the affirmative that is a vessel has entered the operational wheel then operations move to block 5004. If the resultant is in the negative then operations return to decision block 5002 and wait for a vessel to enter the operation wheel.

In block 5004 the vessel is indexed to a shape forming operation. Such a shape forming operation can be one of a plurality of sequential die forming, pressure ram forming, hydro forming, vacuum forming, magnetic impulse forming, or other shape forming operation. For disclosure purposes indexing can be effectuated by way of star wheel 106 or other conveyor as may be required and/or desired in a particular embodiment. Operations then move to block 5006.

In block 5006 the shape forming operation is performed on the vessel. Operations then move to block 5008.

In block 5008 the vessel is indexed to a shape forming operation. Such a shape forming operation can be one of a plurality of sequential die forming, pressure ram forming, hydro forming, vacuum forming, magnetic impulse forming, or other shape forming operation. Operations then move to block 5010.

In block 5010 the shape forming operation is performed on the vessel. Operations then move to decision block 5012.

In decision block 5012 a determination is made as to whether or not vessel decoration is required. If the resultant is required that is vessel decoration is required then operations move to block 5014. If the resultant is in the negative that is vessel decoration is not required then operations move to decision block 5022.

In block 5014 the vessel is indexed to a decoration operation. Such a decoration operation can be one of a plurality of decoration operations that can include printing, laser marking, etching, embossing, de-embossing or other decoration operation as may be required and/or desired in a particular embodiment. For disclosure purposes indexing can be effectuated by way of star wheel 106 or other conveyor as may be required and/or desired in a particular embodiment. Operations then move to block 5016.

In block 5016 the decoration operation is performed on the vessel. Operations then move to block 5018.

In block 5018 the vessel is indexed to a shape forming operation. Such a shape forming operation can be one of a plurality of sequential die forming, pressure ram forming, hydro forming, vacuum forming, magnetic impulse forming, or other shape forming operation. Operations then move to block 5020.

In block 5020 the shape forming operation is performed on the vessel. Operations then move to decision block 5022.

In an exemplary embodiment other operations can be performed. In this regard, the dotted line section of FIG. 24 can be replicated as may be required and/or desired in a particular embodiment to determine if addition operations on the vessel are required and to index and perform such operation. The method continues in decision block 5022.

In decision block 5022 a determination is made as to whether or not another operation is required. If the resultant is in the affirmative that is another operation is required then operations move to block 5024. If the resultant is in the negative that is another operation is not required then operations move to block 5032.

In block 5024 the vessel is indexed to the operation. Such operation can include but not be limited to trimming, smoothing, or other operation as may be required and/or desired in a particular embodiment. For disclosure purposes indexing can be effectuated by way of star wheel 106 or other conveyor as may be required and/or desired in a particular embodiment. Operations then move to block 5026.

In block 5026 the operation is performed on the vessel. Such operations can include, for example and not a limitation, applying a vessel strengthening coating, a texture coating, an insulation coating, a powder coating, a metallic coating, other coating, ultra sound seaming, other non-thermal welding, or other operations as may be required and or desired in a particular embodiment. In this regard, a strengthening coating can be applied to the vessel and when cured provides strength to the vessel allowing the vessel to be more resistant to crush or deformation during loading pressure that are typical in the fill and seal processing. Other coatings for texture can be advantageous to the consumer providing a more gripable vessel for on the go consumption. Other specialty coating can include insulation coating that are beneficial to keep the contents within the vessel colder longer resulting in an enhanced consumer experience. Operations then move to block 5028.

In block 5028 the vessel is indexed to a shape forming operation. Such a shape forming operation can be one of a plurality of sequential die forming, pressure ram forming, hydro forming, vacuum forming, magnetic impulse forming, or other shape forming operation. Operations then move to block 5030.

In block 5030 the shape forming operation is performed on the vessel. Operations then return to decision block 5022.

In block 5032 the vessel exits the operation wheel and the method is exited.

For disclosure purposes conveying or indexing can be incremental with a stop or pause at each operation position or can be continuous motion, wherein the star wheel 106 does not stop or pause at each operation position. An advantage of continuous operation higher throughput of manufactured product. As such, conveying and indexing can be incremental with stops or pauses or continuous motion, as may be required and/or desired in a particular embodiment.

Figure 25:
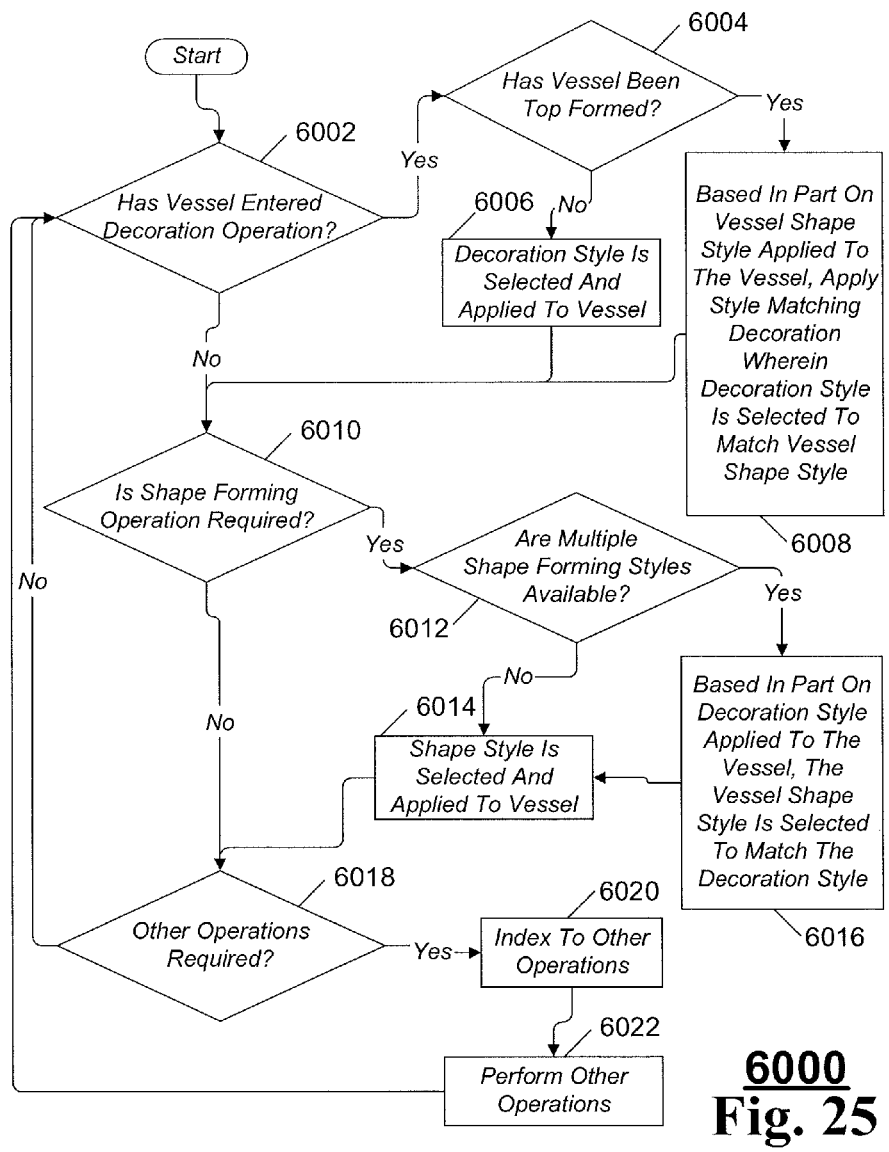
FIG. 25 illustrates one example of a method of top forming and decorating a vessel such that the shape style is matched to the vessel decoration style.

Referring to FIG. 25 there is illustrated one example of a method of top forming and decorating a vessel such that the shape style is matched to the vessel decoration style. In an exemplary embodiment, cylinders can be fed to a decoration station and the selectively shaped based on the type of decoration applied to the cylinders. In this regard, this can allow for mass customized vessels where the vessel shape is coordinated with the decoration being applied to the vessel. As one example and not a limitation, one decoration graphic style can be used for top formed vessels for use with crown finishes, a second decoration graphic style can be used for top formed threaded finish, and a third decoration graphic style can be used for shaped vessel cups.

In another exemplary embodiment a vessel can first be shaped at least partially and then based in part of the vessel shape style a decoration style can be selected to match the shape style and applied to the vessel. For disclosure purposes 'indexing wheel . . . ' refers to a star wheel 106 or other conveyer system indexing cylinders to the appropriate operation wheel 110 work zones 108 positions, such that the operation wheel 110 can engage the vessel and perform the intended operations. The method begins in decision block 6002.

In decision block 6002 a determination is made as to whether or not the vessel has entered the decoration operation. If the resultant is in the affirmative that is the vessel has entered the decoration operations then move to decision block 6004. If the resultant is in the negative that is the vessel has not entered the decoration then operations move to decision block 6010.

In decision block 6004 a determination is made as to whether or not the vessel has been shape formed at least partially. If the resultant is in the affirmative that is the vessel has been shape formed at least partially then operations move to block 6008. If the resultant is in the negative that is the vessel has not been shaped formed then operations move to block 6006.

In block 6006 a decoration style is selected and applied to the vessel. Operations then move to decision block 6010.

In block 6008 based in part of the vessel shape style applied to the vessel, a decoration style is selected and applied to the vessel. In this regard, the decoration style is matched to a vessel shape style. Operations then move to decision block 6010.

In decision block 6010 a determination is made as to whether or not shape forming operations are required. If the resultant is in the affirmative that is shape forming operations are required then operations move to decision block 6012. If the resultant is in the negative that is shape forming operation are not required then operations move to decision block 6018.

In decision block 6012 a determination is made as to whether or not multiple shape forming styles are available. If the resultant is in the affirmative that multiple shape forming styles are available then operations move to block 6016. If the resultant is in the negative that is multiple shapes forming styles are not available then operations move to block 6014.

In block 6014 the vessel is indexed as required and/or desired and shaped in accordance with a selected shape style. The vessel is shape formed. If the shape style is previously selected in block 6016 then the vessel is formed with the block 6016 selected shape style. Operations then move to decision block 6018.

In block 6016 based in part on the decoration style applied to the vessel, the shape style is selected to match the decoration style. Operations then return to block 6014.

In decision block 6018 a determination is made as to whether or not other operations are required. If the resultant is in the affirmative that is other operations are required then operations move to block 6020. If the resultant is in the negative that is other operations are not needed then operations return to decision block 6002.

In block 6020 the vessel is indexed to the other operation. Operations then move to block 6022.

In block 6022 the operation is performed. Such operations can include, for example and not a limitation, applying a vessel strengthening coating, a texture coating, an insulation coating, a powder coating, a metallic coating, other coating, ultra sound seaming, other non-thermal welding, or other operations as may be required and or desired in a particular embodiment. In this regard, a strengthening coating can be applied to the vessel and when cured provides strength to the vessel allowing the vessel to be more resistant to crush or deformation during loading pressure that are typical in the fill and seal processing. Other coatings for texture can be advantageous to the consumer providing a more gripable vessel for on the go consumption. Other specialty coating can include insulation coating that are beneficial to keep the contents within the vessel colder longer resulting in an enhanced consumer experience. Operations then return to decision block 6002.

For disclosure purposes conveying or indexing can be incremental with a stop or pause at each operation position or can be continuous motion, wherein the star wheel 106 does not stop or pause at each operation position. An advantage of continuous operation higher throughput of manufactured product. As such, conveying and indexing can be incremental with stops or pauses or continuous motion, as may be required and/or desired in a particular embodiment.

Figure 26:
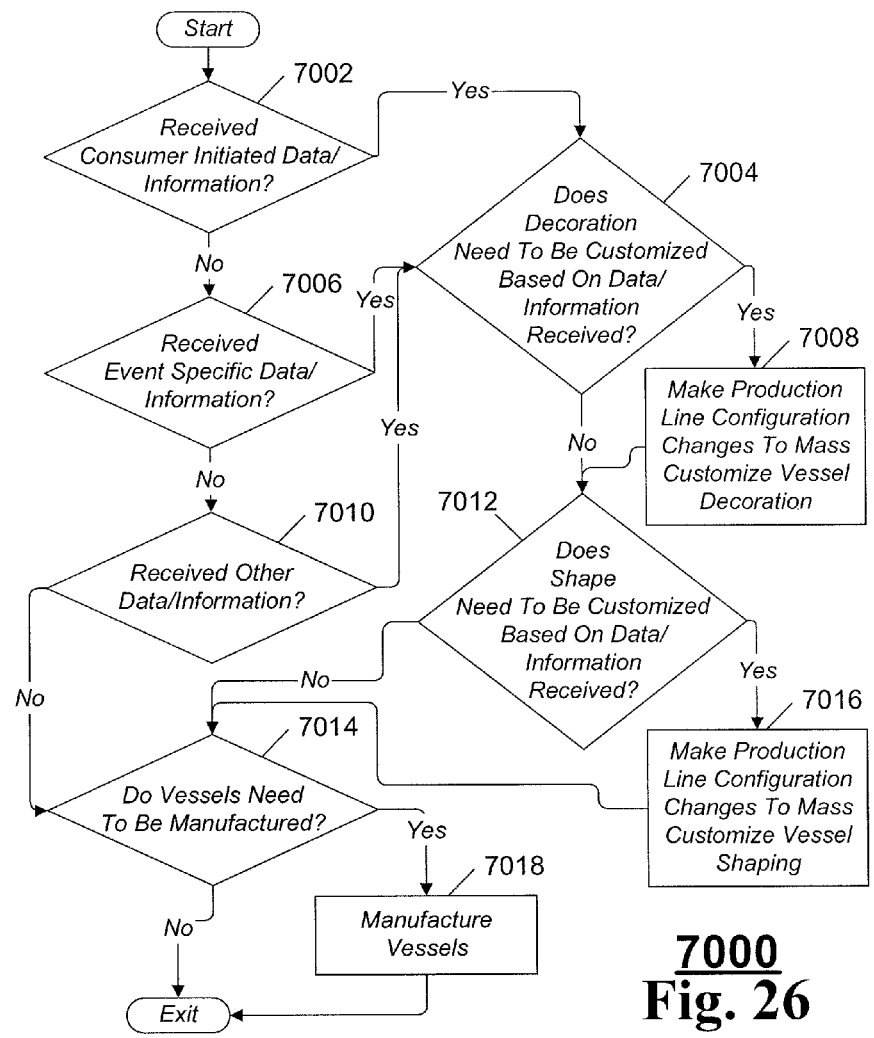
FIG. 26 illustrates one example of a method of configuring a production line to mass customize shaped vessels by configuring the production line based in part on consumer provided data or information, event specific data or information, and/or other sources of data or information.

Referring to FIG. 26 there is illustrated one example of a method of configuring a production line to mass customize shaped vessels by configuring the production line based in part on consumer provided data or information, event specific data or information, and/or other sources of data or information.

In an exemplary embodiment data or information from a consumer, from an event, or from other sources can be used to configure the production line to mass customize shaped vessels. For purposes of disclosure an event can be a sporting event, a school event, a business event, a church event, an organization event, a special occasion event, or other type and/or kind of event as may be required and/or desired in a particular embodiment. In an exemplary embodiment such consumer or event data can be generated when a sales transaction is completed, an order is placed, other by way of other consumer or event data generating methods as may be required and/or desired in a particular embodiment. In the regard, such consumer or event data can be communicated to a controller where the controller is in data communication with a plurality of vessel forming stations having a plurality of shape forming operations and a plurality of non-shape forming operations. In operation each of these vessel forming stations including the plurality of shape forming operations and the plurality of non-shape forming operations can be configure to manufacture the shaped vessel. As such, mass customized vessels can be manufactured by way of remote data communication and remote management of a vessel forming production line.

In another exemplary embodiment, as an example and not a limitation, a consumer can provide data in the form of information to be printed on the vessels. In this regard, the decoration applied to each vessel can be tailored to incorporate the consumer provided information. As such a mass customized vessel can be produced.

In another example and not a limitation, a consumer can specify the kind of closure to be applied to the finished vessels. In this regard, choices for the consumer may be die formed also referred to as die curling, threaded top forming, neck ring, jar top, or other top form can be consumer selectable choices. The consumer can choose and the production line can then be configured to manufacture the shaped vessel with the consumer selected top form finish.

In another example and not a limitation, an event such as a golf tournament can be the source of data and information. Such data and information could include golfer statistics, leader board statistics, tournament schedules, commemorative logos, and other data and information as may be required and/or desired in a particular embodiment. Such data or information can be communicated to the production line, wherein the production line is configured based in part on the received data and vessel decoration and/or vessel shaping is mass customized. The method begins in decision block 7002.

In decision block 7002 a determination is made as to whether or not consumer initiated data or information has been received. If the resultant is in the affirmative that is consumer data or information has been received then operations move to decision block 7004. If the resultant is in the negative that is consumer data or information has not been received then operations move to decision block 7006.

In decision block 7004 a determination is made as to whether or not the decoration needs to be customized based in part of the data or information received. If the resultant is in the affirmative that is the decoration needs to be customized based in part on the data or information received then operations move to block 7008. If the resultant is in the negative that is the decoration does not need to be customized based in part of the data or information received then operations move to decision block 7012.

In decision block 7006 a determination is made as to whether or not event specific data or information has been received. If the resultant is in the affirmative that is event specific data or information has been received then operations move to decision block 7004. If the resultant is in the negative that is event specific data or information has not been received then operations move to decision block 7010.

In block 7008 production line configuration changes are made to mass customize the vessel decoration. Such customization can include, for example and not a limitation, graphic styles, decoration color, text and or graphics, logos, selection of language, and other vessel decoration customizations. Operations then move to decision block 7012.

In decision block 7010 a determination is made as to whether or not other data or information has been received. If the resultant is in the affirmative that is other data or information has been received then operations move to decision block 7004. If the resultant is in the negative that is other data or information has not been received then operations move to decision block 7014.

In decision block 7012 a determination is made as to whether or not the vessel shape needs to be customized based in part on the data or information received. If the resultant is in the affirmative that is the shape of the vessel needs to be customized based in part on the data or information received then operations move to block 7016. If the resultant is in the negative that is the shape of the vessel does not need to be customized based in part on the data or information received then operations move to decision block 7014.

In decision block 7014 a determination is made as to whether or not vessels need to be manufactured. If the resultant is in the affirmative that is vessels need to be manufactured then operations move to block 7018. If the resultant is in the negative that is vessels do not need to be manufactured then the method is exited.

In block 7016 production line configuration changes are made to mass customize the vessel shape. Such customization can include, for example and not a limitation, top forming style, shape styles, and other vessel shape customizations. Operations then move to decision block 7014.

In block 7018 vessels are manufactured based in part on quantities needed, decoration mass customization, and/or shape mass customization. In an exemplary embodiment, for example and not a limitation, in addition to decoration and shaping production line configuration and mass customization, consumer, event, or other sources of data and/or information can indicate the quantity of vessels to manufacture as well as decoration and/or shape customizations. The method is then exited.

Figure 27:
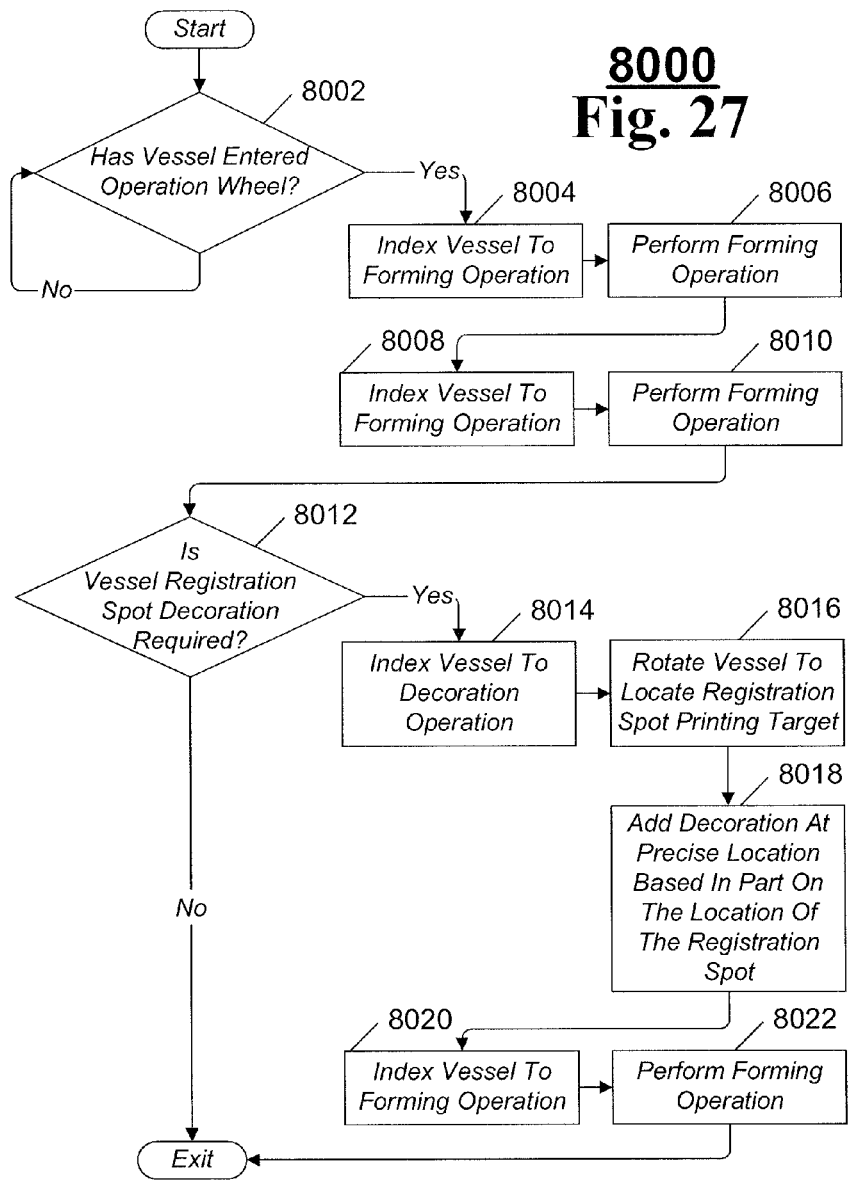
FIG. 27 illustrates one example of a method of performing registered printing.

Referring to FIG. 27 here is illustrated one example of a method of performing registered printing. In an exemplary embodiment, an operation of registered printing can be inserted into a sequence of shape forming operations. In this regard, a determination can be made is spot decoration is required. If required the vessel can be indexed to the appropriate operation, wherein the vessel is first rotated to locate the registration spot. This operation aligns the vessel such that a subsequent operation can apply decoration at a precise location on the vessel based in part on the location of the registration spot. Shape forming can then proceed. The method begins in decision block 8002.

In decision block 8002 a determination is made as to whether or not a vessel has entered the operation wheel. If the resultant is in the affirmative that is a vessel has entered the operational wheel then operations move to block 8004. If the resultant is in the negative then operations return to decision block 8002 and wait for a vessel to enter the operation wheel.

In block 8004 the vessel is indexed to a shape forming operation. Such a shape forming operation can be one of a plurality of sequential die forming, pressure ram forming, hydro forming, vacuum forming, magnetic impulse forming, or other shape forming operation. For disclosure purposes indexing can be effectuated by way of star wheel 106 or other conveyor as may be required and/or desired in a particular embodiment. Operations then move to block 8006.

In block 8006 the shape forming operation is performed on the vessel. Operations then move to block 8008.

In block 8008 the vessel is indexed to a shape forming operation. Such a shape forming operation can be one of a plurality of sequential die forming, pressure ram forming, hydro forming, vacuum forming, magnetic impulse forming, or other shape forming operation. Operations then move to block 8010.

In block 8010 the shape forming operation is performed on the vessel. Operations then move to decision block 8012.

In decision block 8012 a determination is made as to whether or not vessel registration spot decoration is required. If the resultant is in the affirmative that is registration spot decoration is required then operations move to block 8014. If the resultant is in the negative that is registration spot decoration is not required then the method is exited.

In block 8014 the vessel is indexed to a decoration operation. Such a decoration operation can be one of a plurality of decoration operations that can include printing, laser marking, etching, embossing, de-embossing or other decoration operation as may be required and/or desired in a particular embodiment. For disclosure purposes indexing can be effectuated by way of star wheel 106 or other conveyor as may be required and/or desired in a particular embodiment. Operations then move to block 8016.

In block 8016 the vessel is rotated until a registration spot printing target located on the vessel is located. This registration spot is part of an initial decoration application and can be used in subsequent operations such as this operation to align the cylinder so that additional decoration can be applied in specific locations. In this regard, the vessel is first rotate until aligned and then a decoration can be applied to the vessel. After alignment operations move to block 8018.

In block 8018 additional decoration at a precise location based on the location of the reference spot is applied to the vessel. Such decoration can be an image, embossing, de-embossing, or other decoration as may be required and or desired in a particular embodiment. Operations then moves to block 8020.

In block 8020 the vessel is indexed to a shape forming operation. Such a shape forming operation can be one of a plurality of sequential die forming, pressure ram forming, hydro forming, vacuum forming, magnetic impulse forming, or other shape forming operation. Operations then move to block 8022.

In block 8022 the shape forming operation is performed on the vessel. The method is the exited.

Figure 28:
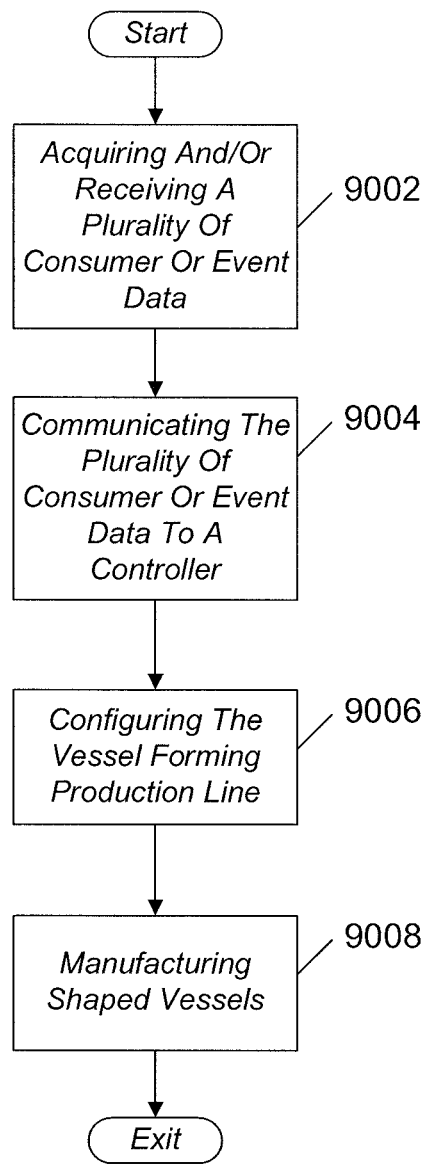
FIG. 28 illustrates one example of a method of remote control and management of a vessel forming production line.

Referring to FIG. 28 there is illustrated one example of a method of remote control and management of a vessel forming production line. In an exemplary embodiment a plurality of consumer or event data can be acquired and/or otherwise received from order entry, transactions such as sales transaction and other transactions, data sources, or other sources and/or methods as may be required and or desired in a particular embodiment. The acquired plurality of consumer or event data can be communicated to a controller, such as controller 504 by way of remote data communications 502. Such plurality of consumer or event data can be communicated by way of a remote global network based data processing resource or other data processing resources and/or methods as may be required and or desired in a particular embodiment. The plurality of consumer or event data can then be used to configure the production line equipment including for example and not a limitation vessel forming stations 100, 400, a plurality of shape forming operations, a plurality of non-shape forming operations, cylinder feeders 506, cylinder decoration 508, top formers, trimmers, printers, etchers, laser markers, coating operations, and/or other production line equipment as may be required and/or desired in a particular embodiment. The production line can then be utilized to manufacture shaped vessels. In this regard, a plurality of consumer or event data can be utilized to effectuate remote control and management of a vessel forming production line including controlling shape and non-shape forming operations, decoration, and other features of the production line. The method begins in block 9002.

In block 9002 a plurality of consumer or event data is acquired and/or otherwise received. Such data can be acquired and/or received from consumer initiated transactions, orders, event, or other sources as may be required and/or desired in a particular embodiment. For purposes of disclosure an event can be a sporting event, a school event, a business event, a church event, an organization event, a special occasion event, or other type and/or kind of event as may be required and/or desired in a particular embodiment. In addition, the plurality of consumer or event data can be generated by completing a sales transaction or other type of transaction, or by placing an order, or generated based in part of the current status of an event. Furthermore, the plurality of consumer or event data can be utilized to influence or incorporate customizations into the vessels being manufactured in the decorating operations. Operations then move to block 9004.

In block 9004 the plurality of consumer or event data is communicated to a controller 504. In an exemplary embodiment such data communication can be from a remote data processing resource. The controller 504 controls the production line equipment including at least some of the shape forming operations or non-shape forming operations. In an exemplary embodiment the controller 504 can control or have data communication access to all the equipment on the production line. Operations then move to block 9006.

In block 9006 the vessel forming production line is configured. In an exemplary embodiment each of the plurality of shape forming operations, the plurality of non-shape forming operations, cylinder feeders, decoration operations, and other equipment and/or operations can be configured based in part on the plurality of consumer or event data to manufacture customized shaped vessels.

In another exemplary embodiment, the production line can be initially configures to manufacture a standard shaped vessel and then the plurality of consumer or event data can be used to further configure the production line adding any necessary customizations to the shaped vessels being manufactured. In this regard, the plurality of consumer or event data can be used to mass customize otherwise standard manufactured vessels. Operations then move to block 9008.

In block 9008 the shaped vessels are manufactured in accordance with the acquired and/or received consumer or event data. The method is then exited.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of configuring a production line to mass customize shaped vessels, said method comprising:
   receiving, by a processor, consumer or event data;
   determining whether at least one of a decoration and shape of a vessel needs to be customized based in part on said consumer or event data;
   responsive to determining that at least one of said decoration and shape of said vessel needs to be customized, changing, by a controller, a configuration of at least one of a plurality of vessel forming stations each being inclusive of a plurality of work zones from an initial configuration to another configuration that causes indexing of the vessel through the plurality of work zones within the at least one of the plurality of vessel forming stations to be altered based in part on said consumer or event data; and
   shaping a plurality of vessels by indexing said plurality of vessels through selected work zones of said plurality of vessel forming stations.

2. The method in accordance with claim 1, wherein
   each of said plurality of vessel forming stations comprises at least one opposing facing pair of operation wheels, and
   indexing said plurality of vessels through said plurality of vessel forming stations comprises rotating, by a star wheel, said plurality of vessels in a clockwise direction or counterclockwise direction.

3. The method in accordance with claim 1, wherein said shaping further comprises shaping by contouring a length of each of said plurality of vessels.

4. The method in accordance with claim 1, further comprising:
   shaping said plurality of vessels by subjecting said plurality of vessels to a plurality of die forming operations.

5. The method in accordance with claim 1, further comprising:
   shaping said plurality of vessels by subjecting said plurality of vessels to a pressure ram forming operation.

6. The method in accordance with claim 1, further comprising:
   shaping said plurality of vessels by subjecting said plurality of vessels to a hydro forming operation.

7. The method in accordance with claim 1, further comprising:
   shaping said plurality of vessels by subjecting said plurality of vessels to a magnetic impulse forming operation.

8. The method in accordance with claim 1, further comprising:
   selecting a decoration style to be applied to said plurality of vessels based in part on said consumer or event data.

9. The method in accordance with claim 1, further comprising:
   decorating said plurality of vessels with at least part of said consumer or event data.

10. The method in accordance with claim 1, further comprising:
    determining a quantity of said plurality of vessels based on said consumer or event data.

11. The method in accordance with claim 1, further comprising:
    determining whether a printing operation needs to be performed at a pre-determined spot on a vessel of said plurality of vessels;
    responsive to determining that said printing operation needs to be performed at said pre-determined spot, rotating the vessel at a work zone to locate said pre-determined spot of said vessel; and
    applying a decoration to said vessel at said pre-determined spot.

12. The method in accordance with claim 1, wherein changing the configuration of at least one of a plurality of vessel forming stations is performed dynamically.

13. The method in accordance with claim 1, wherein the event data is indicative of a sporting event.

14. The method in accordance with claim 1, further comprising communicating signals, responsive to said consumer or event data, to the at least one vessel forming station to cause the at least one vessel forming station to change configurations.

15. The method in accordance with claim 1, further comprising communicating signals, responsive to said consumer or event data, to the at least one vessel forming station to cause the at least one vessel forming station to change non-shape forming operations.

16. A method of configuring a production line to mass customize shaped vessels, said method comprising:
    receiving, by a processor, consumer or event data;
    determining whether at least one of a decoration and shape of a vessel needs to be customized based in part on said consumer or event data;
    responsive to determining that said decoration of said vessel needs to be customized, configuring a decoration station based in part on said consumer or event data;
    responsive to determining that said shape of said vessel needs to be customized, changing, by a controller, a configuration of at least one of a plurality of vessel forming stations each being inclusive of a plurality of work zones from an initial configuration to another configuration that causes indexing of the vessel through the plurality of work zones within the at least one of the plurality of vessel forming stations to be altered based in part on said consumer or event data; and
    shaping and decorating a plurality of vessels by indexing said plurality of vessels through selected work zones of said decoration station and selected work zones of said plurality of vessel forming stations.

17. The method in accordance with claim 16, wherein each of said plurality of vessel forming stations comprises at least one opposing facing pair of operation wheels,
    indexing said plurality of vessels through said plurality of vessel forming stations comprises rotating, by a star wheel, said plurality of vessels in a clockwise direction or a counterclockwise direction.

18. The method in accordance with claim 16, further comprising:
    configuring a top-forming station based in part on said consumer or event data; and
    shaping said plurality of vessels by subjecting said plurality of vessels to a pressure ram forming operation.

19. The method in accordance with claim 16, further comprising: shaping said plurality of vessels by subjecting said plurality of vessels to a hydro forming operation.

20. The method in accordance with claim 16, further comprising:
    selecting a decoration style to be applied to said plurality of vessels based in part on said consumer or event data.

21. The method in accordance with claim 16, further comprising:
    decorating said plurality of vessels with at least part of said consumer or event data.

22. The method in accordance with claim 16, further comprising:

determining a quantity of said plurality of vessels based on said consumer or event data.

23. A method of configuring a production line to mass customize shaped vessels, said method comprising:

receiving, by a processor, consumer or event data;

determining whether at least one of a decoration and shape of a vessel needs to be customized based in part on said consumer or event data;

responsive to determining that said decoration of said vessel needs to be customized, configuring, by a controller, a decoration station based in part on said consumer or event data;

responsive to determining that at least one of said decoration and shape of said vessel needs to be customized, changing, by the controller, a configuration of at least one of a plurality of vessel forming stations each being inclusive of a plurality of work zones from an initial configuration to another configuration that causes indexing of the vessel through the plurality of work zones within the at least one of the plurality of vessel forming stations to be altered based in part on said consumer or event data, each of said plurality of vessel forming stations comprising at least one operation wheel;

selecting, by the controller, a pathway through said plurality of vessel forming stations;

controlling, by the controller, a rotational indexing direction of at least one operation wheel of said plurality of vessel forming stations according to said pathway; and shaping and decorating a plurality of vessels by indexing said plurality of vessels through selected work zones of said decoration station and selected work zones of said plurality of vessel forming stations.

24. The method in accordance with claim 23, wherein each of said plurality of vessel forming stations comprises an opposing facing pair of operation wheels, each operation wheel further comprising a plurality of work zones, and controlling a rotational indexing direction comprises rotating said at least one operation wheel in a clockwise or counterclockwise direction.

\* \* \* \* \*